(12) United States Patent
Shigei

(10) Patent No.: US 12,211,310 B2
(45) Date of Patent: Jan. 28, 2025

(54) IMAGING DEVICE

(71) Applicant: SONY GROUP CORPORATION, Tokyo (JP)

(72) Inventor: Hiroyuki Shigei, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/556,682

(22) PCT Filed: Mar. 1, 2022

(86) PCT No.: PCT/JP2022/008690
§ 371 (c)(1),
(2) Date: Oct. 23, 2023

(87) PCT Pub. No.: WO2022/239393
PCT Pub. Date: Nov. 17, 2022

(65) Prior Publication Data
US 2024/0242530 A1  Jul. 18, 2024

(30) Foreign Application Priority Data

May 12, 2021  (JP) .................................. 2021-081061

(51) Int. Cl.
*G06V 40/13* (2022.01)
*H04N 23/51* (2023.01)
*H04N 23/52* (2023.01)
*H04N 23/56* (2023.01)

(52) U.S. Cl.
CPC ......... *G06V 40/1318* (2022.01); *H04N 23/51* (2023.01); *H04N 23/52* (2023.01); *H04N 23/56* (2023.01)

(58) Field of Classification Search
CPC .... G06V 40/1318; H04N 23/51; H04N 23/52; H04N 23/56
See application file for complete search history.

(56) References Cited

U.S. PATENT DOCUMENTS

2021/0041737 A1* 2/2021 Aoki ................. G02F 1/133512

FOREIGN PATENT DOCUMENTS

| JP | 2001-275959 A | 10/2001 |
|----|---------------|---------|
| JP | 2016-025164 A | 2/2016 |
| JP | 2021-028691 A | 2/2021 |

OTHER PUBLICATIONS

International Search Report and Written Opinion of PCT Application No. PCT/JP2022/008690, issued on May 17, 2022, 09 pages of ISRWO.

* cited by examiner

*Primary Examiner* — Jonathan A Boyd
(74) *Attorney, Agent, or Firm* — CHIP LAW GROUP

(57) ABSTRACT

Provided is an imaging device that includes an element layer including an image forming element, an illumination element provided at the same position as that of the element layer or behind the element layer in the forward-and-rearward direction, and an imaging element provided behind the image forming element and the illumination element. The illumination element is provided at a position different from that of the image forming element when viewed from the forward-and-rearward direction.

15 Claims, 16 Drawing Sheets

FIG.14
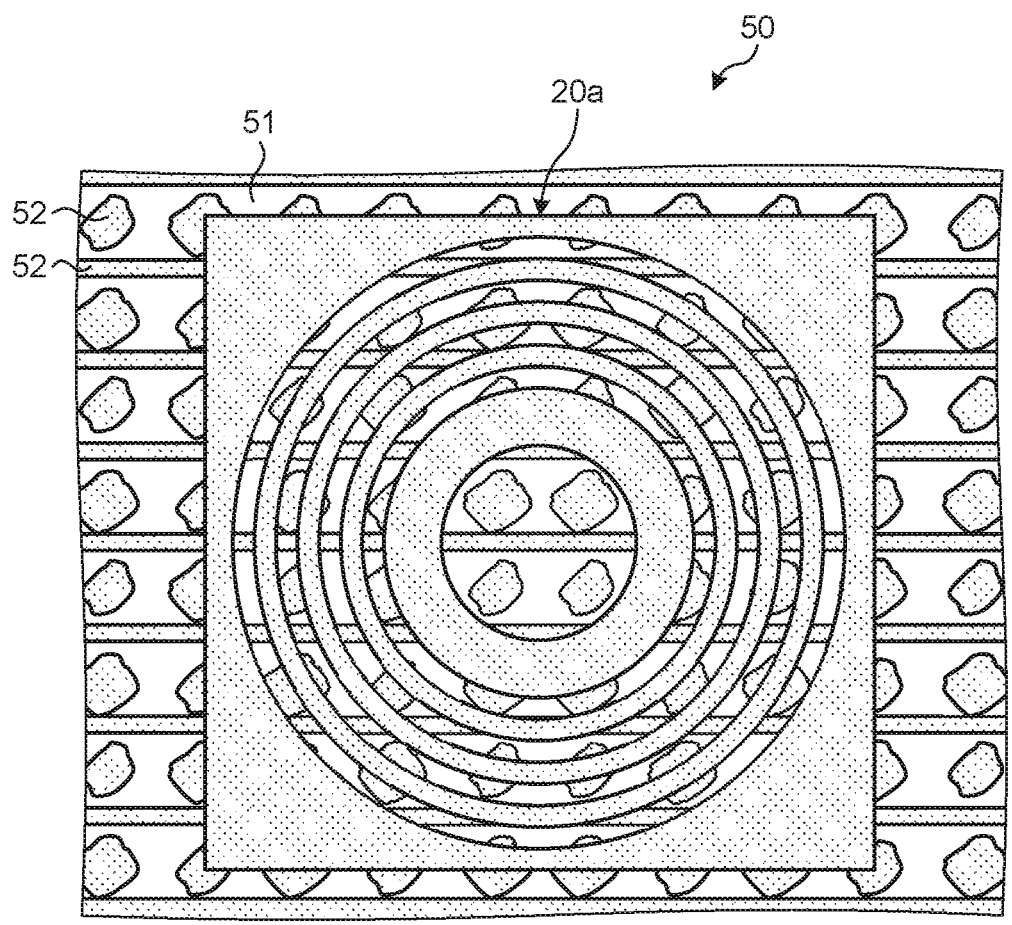
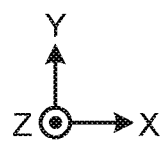

IMAGING DEVICE

CROSS REFERENCE TO RELATED APPLICATIONS

This application is a U.S. National Phase of International Patent Application No. PCT/JP2022/008690 filed on Mar. 1, 2022, which claims priority benefit of Japanese Patent Application No. JP 2021-081061 filed in the Japan Patent Office on May 12, 2021. Each of the above-referenced applications is hereby incorporated herein by reference in its entirety.

FIELD

The present disclosure relates to an imaging device.

BACKGROUND

It is known that an image forming element such as a pinhole is used in imaging (for example, refer to Patent Literature 1).

CITATION LIST

Patent Literature

Patent Literature 1: JP 2016-25164 A

SUMMARY

Technical Problem

For example, an imaging device of a close-up photography type is required to include an illumination element for illuminating a subject. There is a problem in that the imaging device becomes large by the amount of the illumination elements provided in the imaging device.

One aspect of the present disclosure enables downsizing of an imaging device.

Solution to Problem

An imaging device according to one aspect of the present disclosure includes: an element layer including an image forming element; an illumination element provided at the same position as a position of the element layer or behind the element layer in a forward-and-rearward direction; and an imaging element provided behind the image forming element and the illumination element, wherein the illumination element is provided at a position different from a position of the image forming element when viewed from the forward-and-rearward direction.

BRIEF DESCRIPTION OF DRAWINGS

FIG. 14 is a diagram illustrating an example of a schematic configuration of the imaging device.

DESCRIPTION OF EMBODIMENTS

Figure 1:
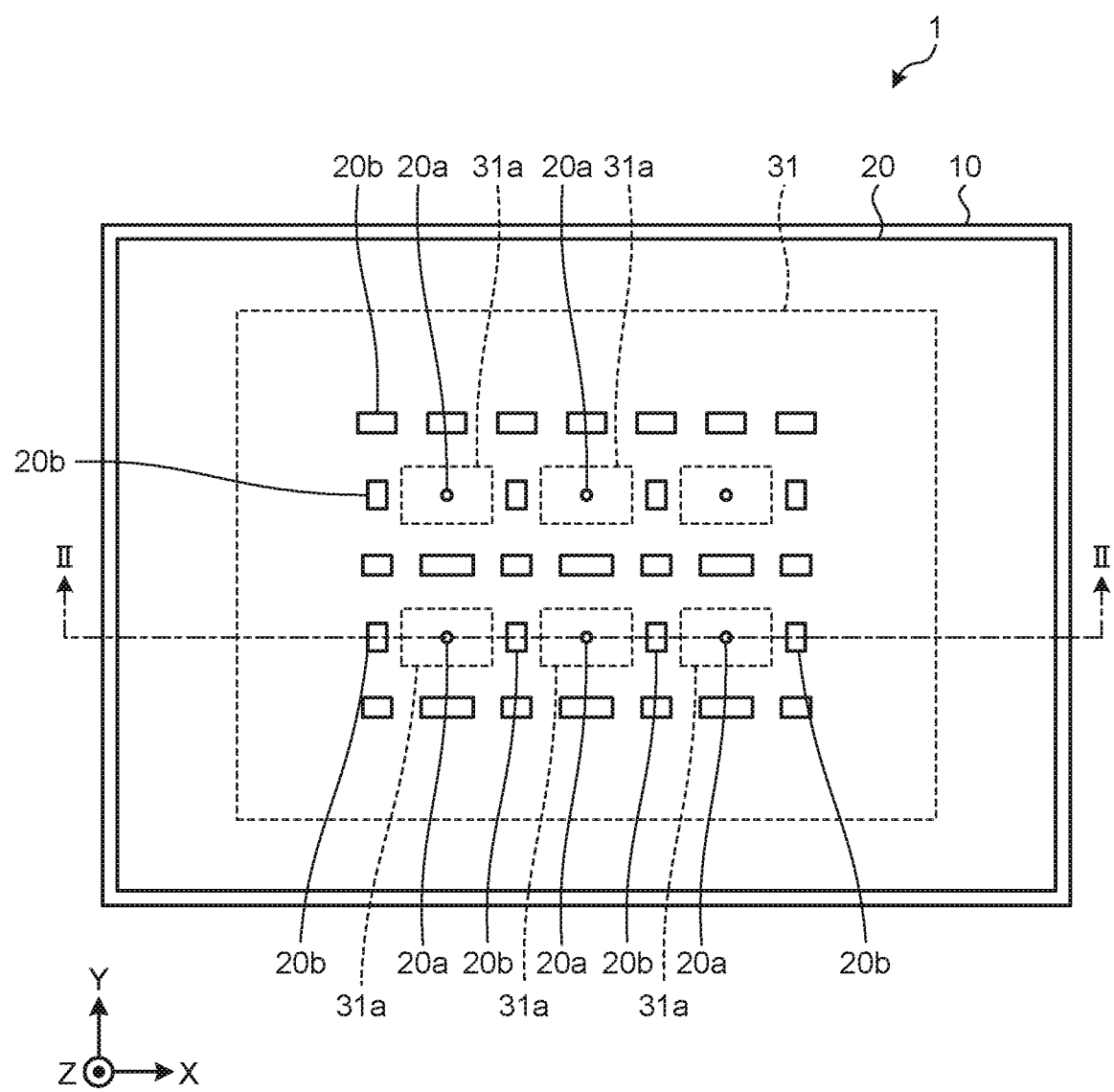
FIG. 1 is a diagram illustrating an example of a schematic configuration of an imaging device according to an embodiment.

Hereinafter, embodiments of the present disclosure will be described in detail with reference to the drawings. It is noted that, in each of the following embodiments, the same parts are denoted by the same reference numerals, and redundant description will be omitted.

The present disclosure will be described according to the following order of items.
1. Embodiment
2. Modification
3. Application example
4. Application example to moving body
5. Application example to endoscopic surgery system
6. Example of effects

1. Embodiment

Figure 2:
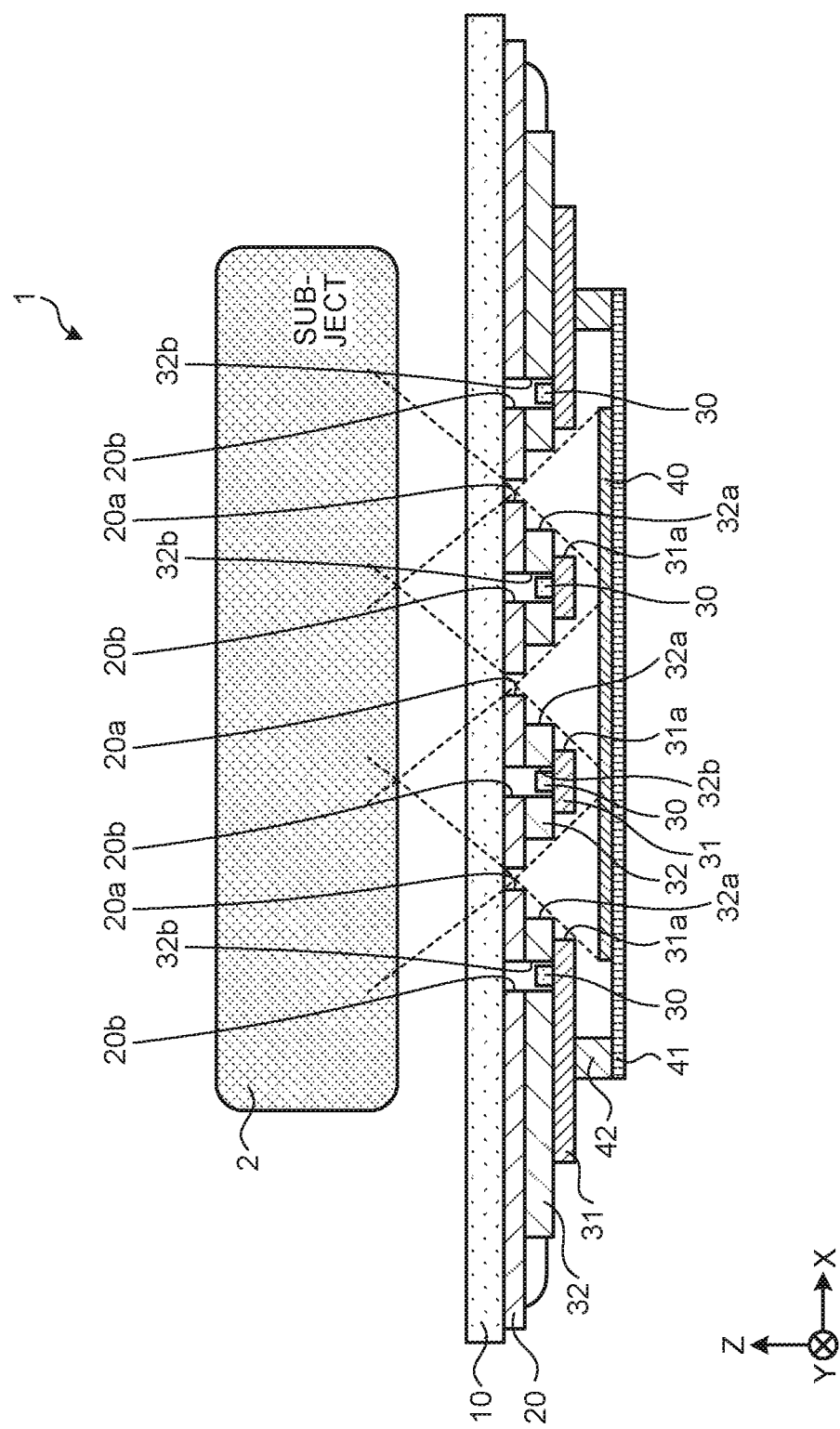
FIG. 2 is a diagram illustrating an example of a schematic configuration of the imaging device.

FIGS. 1 and 2 are diagrams illustrating an example of a schematic configuration of an imaging device according to an embodiment. In the drawings, an XYZ coordinate system is shown. The Z-axis direction corresponds to the forward-and-rearward direction of an imaging device 1. The Z-axis positive direction corresponds to the forward direction of the imaging device 1, and the Z-axis negative direction corresponds to the rearward direction of the imaging device 1. The X-axis and the Y-axis correspond to the vertical and horizontal directions of the imaging device 1.

FIG. 1 illustrates a schematic configuration of the imaging device 1 when viewed from the front (as viewed from the front side). In FIG. 1, some of the elements that are not directly visible are illustrated in broken lines. FIG. 2 schematically illustrates a cross section of the imaging device 1 when viewed along line II-II in FIG. 1. It is noted that the size of each element appearing in the drawings is not necessarily accurate, and the same applies to other drawings.

An object to be imaged by the imaging device 1 is referred to as a subject 2 (FIG. 2). The imaging device 1 is, for example, an imaging device of a close-up photography type, and receives light from the subject 2 positioned relatively close to the front of the imaging device 1 (for example, several tens of centimeters or less, several centimeters or less, several millimeters or less, or the like from the imaging device 1), thereby capturing an image of the subject 2. An example of the subject 2 positioned close thereto is a finger, and in this case, the imaging device 1 may function as a fingerprint imaging device. The imaging device 1 can also receive light from the subject 2 positioned in front of the imaging device 1 and positioned relatively far therefrom (for example, separated from the imaging device 1 by several tens of centimeters or more, several meters or more, or the like), and can capture an image of the subject 2.

The imaging device 1 includes a transparent layer 10, an element layer 20, an illumination element 30, an illumination substrate 31, and a wall portion 32, and an imaging element 40, an imaging substrate 41, and a wall portion 42.

The transparent layer 10 can form a front portion of the imaging device 1. An example of a material of the transparent layer 10 is glass or the like, and an example of the refractive index thereof is about 1.46. An example of the thickness of the transparent layer 10 is several mm or less, 1 mm or less, or the like. The transparent layer 10 is mainly used to hold the element layer 20. When the structure is maintained only by the element layer 20, the transparent layer 10 may not be provided. The transparent layer 10 may have an antireflection film such as AR coating on the surface thereof.

The element layer 20 is provided behind the transparent layer 10.

The element layer 20 is a layer having opacity. The element layer 20 may be an impermeable film deposited on the rear surface of the transparent layer 10. Examples of a material of the impermeable film include chromium and aluminum. The present disclosure is not limited thereto, and various materials may be used. Examples of other materials are bamboo, stone, and the like. The thickness of the element layer 20 may be negligibly small (much thinner than shown in the drawing) relative to the transparent layer 10.

The element layer 20 includes a plurality of image forming elements 20a and a plurality of openings 20b.

The image forming element 20a forms an image with light from the subject 2. In FIG. 2, an image forming range by the image forming element 20a is schematically illustrated by a broken line. Each image forming element 20a is provided at a different position in the layer direction (XY plane direction) of the element layer 20. The image forming elements 20a may be provided such that the image forming ranges thereof do not overlap each other on the imaging element 40, or may be provided such that the image forming ranges overlap each other thereon. An example of a distance between the image forming elements 20a is about several mm or 1 mm or less.

The image forming element 20a is a thin type image forming element. Examples of the image forming element 20a include a pinhole, a photon sieve, a microlens, and a Fresnel zone plate. Such an image forming element 20a is configured to include a light-transmitting region provided in the element layer 20. The light-transmitting region is provided, for example, by forming a hole (fine hole) in the element layer 20. In the example illustrated in FIG. 2, the image forming element 20a is a hole (pinhole) formed in the element layer 20. It is noted that, as described above, in a case where the element layer 20 including the image forming element 20a can maintain a single layer structure, the transparent layer 10 may not be provided.

The size of the hole included in the image forming element 20a will be described. When the hole has a circular shape, the diameter thereof may be, for example, 50 μm or less, 40 μm or less, 30 μm or less, 20 μm or less, or the like. When the hole has a shape other than the circular shape, the size thereof may be a size having an area substantially equal to an area of the circular shape described above. The image forming element 20a may have a tapered structure. The tapered structure may have a tapered shape, the area of which (cross-sectional area viewed from the Z-axis direction) increases toward the Z-axis negative direction. As a result, the angle of view can be made wider.

By using the small hole as described above as the image forming element 20a, high-resolution imaging can be performed. Since the image forming element 20a is hardly visible when the imaging device 1 is viewed from the front, it is possible to hide the presence of the image forming element 20a. Therefore, the texture of the imaging device 1 can be enhanced.

The opening 20b is provided in front of the illumination element 30 so that the subject 2 is irradiated with light from the illumination element 30. When viewed from the forward-and-rearward direction, at least a part of the opening 20b may overlap or may not overlap a part of the corresponding illumination element 30. The opening 20b may be smaller or larger than the illumination element 30. In the example illustrated in FIGS. 1 and 2, the opening 20b has substantially the same size as that of the illumination element 30 or a size slightly larger than that of the illumination element 30. The opening 20b may have a tapered structure. As a result, the illumination angle of the illumination can be made wider.

The illumination element 30 is provided at the same position as that of the element layer 20 or behind the element layer 20 in the forward-and-rearward direction. In the example illustrated in FIGS. 1 and 2, the illumination element 30 is provided behind (the opening 20b) of the element layer 20. The imaging device 1 can be downsized (for example, thinned) by the amount of the illumination element 30 provided behind the element layer 20, that is, provided in the immediate vicinity thereof. An example of the illumination element 30 is a light emitting diode (LED) or the like. By using a small LED, the possibility that the imaging device 1 can be downsized is further increased.

The illumination element 30 may be provided at a density capable of uniformly irradiating the subject 2. The illumination element 30 is provided at a position different from that of the image forming element 20a (the position at which the illumination element 30 does not overlap the image forming element 20a) when viewed from the forward-and-rearward direction. More specifically, the illumination element 30 is provided at a position that does not interfere with image formation by the image forming element 20a. In the example illustrated in FIGS. 1 and 2, at least some of the illumination elements 30 among the plurality of illumination elements 30 are provided between the adjacent image forming elements 20a. For example, in this manner, the illumination element 30 can be efficiently disposed in the imaging device 1.

The illumination substrate 31 supports the illumination element 30 from the rear side (toward the Z-axis positive direction). The illumination element 30 is provided on the front surface of the illumination substrate 31.

The illumination substrate 31 has a plurality of openings 31a. The opening 31a is provided corresponding to the image forming element 20a of the element layer 20. The opening 31a has a size that does not interfere with image formation by the corresponding image forming element 20a. As illustrated in FIG. 1, the illumination substrate 31 may have a lattice shape in which portions other than the plurality of openings 31a are connected in a lattice shape.

The illumination substrate 31 also supports the wall portion 32 similarly to the illumination element 30. The wall portion 32 is provided so as to surround the illumination element 30 when viewed from the forward-and-rearward direction. In the example illustrated in FIG. 2, the wall portion 32 has a height (length in the Z-axis direction) larger than the height of the illumination element 30, and is connected between the element layer 20 and the illumination substrate 31 so as to fill a space between the element layer 20 and the illumination substrate 31. The wall portion 32 has opacity. Examples of a material of the wall portion 32 are metal, resin, and the like.

The wall portion 32 has a plurality of openings 32a and a plurality of openings 32b. The opening 32a is provided corresponding to the image forming element 20a. The opening 32a has a size that does not interfere with image formation by the corresponding image forming element 20a. The opening 32b is a portion that accommodates the illumination element 30. The wall portion 32 may be, for example, a metal plate, a resin plate, or the like in which the opening 32a and the opening 32b are formed.

The illumination substrate 31 and the wall portion 32 function as a light shielding portion that shields light from the illumination element 30 to the imaging element 40. The light shielding portion suppresses leakage of the illumination to the imaging surface, that is, reflection of the illumination element 30. The illumination substrate 31 is provided behind the illumination element 30 and functions as a light shielding wall (first light shielding wall) that shields light directed toward the rear (Z-axis negative direction) among the light from the illumination element 30. The wall portion 32 is provided so as to surround the illumination element 30 when viewed from the forward-and-rearward direction, and functions as a light shielding wall (second light shielding wall) that shields light directed in the vertical and horizontal directions (XY plane direction) among the light from the illumination element 30.

The imaging element 40 is provided behind the image forming element 20a and provided further behind the illumination element 30. An example of a distance between the image forming element 20a and the imaging element 40 is several mm or less, 1 mm or less, or the like. The imaging element 40 has a light receiving surface formed to extend in the XY plane direction. Examples of the imaging element include a complementary metal oxide semiconductor (CMOS) sensor, a charge coupled device (CCD) sensor, and the like.

In the example illustrated in FIG. 2, in the subject 2, image forming ranges of the image forming elements 20a adjacent to each other may partially overlap each other. In this case, the imaging element 40 receives light (images) from an overlapping portion in an overlapping manner. The overlapped and received images are separated by subsequent signal processing or the like, thereby making it possible to obtain an image in which the overlapping is eliminated. For example, a brighter image can be obtained as compared with a case in which there is no overlapping portion.

The imaging substrate 41 supports the imaging element 40 and the wall portion 42 from behind. The imaging element 40 and the wall portion 42 are provided on the imaging substrate 41.

The wall portion 42 is provided so as to surround the imaging element 40 when viewed from the forward-and-rearward direction. In the example illustrated in FIG. 2, the wall portion 42 has a height larger than a height of the illumination element 30, and is connected between the illumination substrate 31 and the imaging substrate 41 so as to fill a space between the illumination substrate 31 and the imaging substrate 41. The wall portion 42 has opacity similarly to the wall portion 32.

The imaging substrate 41 and the wall portion 42 function as a light shielding portion that shields light from the outside to the imaging element 40. The imaging substrate 41 shields light from the rear of the imaging element 40 toward the imaging element 40. The wall portion 42 shields light directed toward the imaging element 40 in the vertical and horizontal directions of the imaging element 40.

An operation outline of the imaging device 1 will be described. Light from the illumination element 30 passes through the opening 20b and the transparent layer 10, and is emitted to the subject 2. The light from the subject 2 passes through the transparent layer 10 and the image forming element 20a of the element layer 20, and is received by the imaging element 40. For example, when the imaging device 1 is a fingerprint imaging device, the subject 2 is a finger, and a fingerprint of the finger is imaged. In a case where the imaging device 1 is an imaging device, the subject 2 is a face of a person or the like, and the face of the person is imaged.

In the imaging device 1 described above, the plurality of illumination elements 30 are provided at the same position as that of the element layer 20 or provided behind the element layer 20 in the forward-and-rearward direction. When viewed from the forward-and-rearward direction, the illumination element 30 is provided at a position different from that of the image forming element 20a (for example, provided between the image forming elements 20a). By providing the illumination element 30 immediately after the element layer 20 and between the image forming elements 20a in this manner, for example, the imaging device 1 can be downsized (thinned or the like) as compared with a case in which an illumination element such as a light guide plate is provided in front of the element layer 20. Illumination (direct illumination structure) of the subject 2 in a state where the subject 2 is not in contact with the light guide plate is also possible. There is no problem such as image quality deterioration due to reflection of illumination. When the illumination element is provided immediately beside the imaging element 40 or the like, it is necessary to increase a distance to the subject 2 in order to secure an illumination range (substantial imaging range) in front of the imaging element 40, but such a problem does not occur in the imaging device 1.

The illumination substrate 31 and the wall portion 32 existing around the illumination element 30 can function as a light shielding portion that shields light from the illumination element 30 to the imaging element 40. For example, the possibility that the imaging device 1 can be downsized (thickness reduction, area reduction, and the like) is further increased as compared with a case in which the light shielding portion is provided at a position away from the illumination element 30. Reflection of the illumination element 30 is also suppressed.

The imaging device 1 can be easily assembled. For example, the imaging device 1 can be assembled by overlapping the element layer 20, the illumination substrate 31, the imaging substrate 41, and the like on the basis of the positions of the image forming element 20a, the opening 20b, the opening 32a, the opening 32b, and the like. It is also possible to easily perform alignment in consideration of suppression of reflection of the illumination element 30.

The subsequent signal processing can also be simplified. For example, it is conceivable to include processing of removing the influence of reflection in signal processing in the subsequent stage after allowing the reflection, but the signal processing in the subsequent stage becomes complicated. With the imaging device 1, it is not necessary to perform the processing of removing the influence of reflection, and as such it is possible to simplify the signal processing in the subsequent stage.

2. Modification

The above-described embodiment is merely one example of the disclosed technology. Some modifications will be described.

In one embodiment, light from the subject 2 may be received and the subject 2 may be imaged in a state where the subject 2 is in contact with the imaging device 1. This will be described with reference to FIG. 3.

Figure 3:
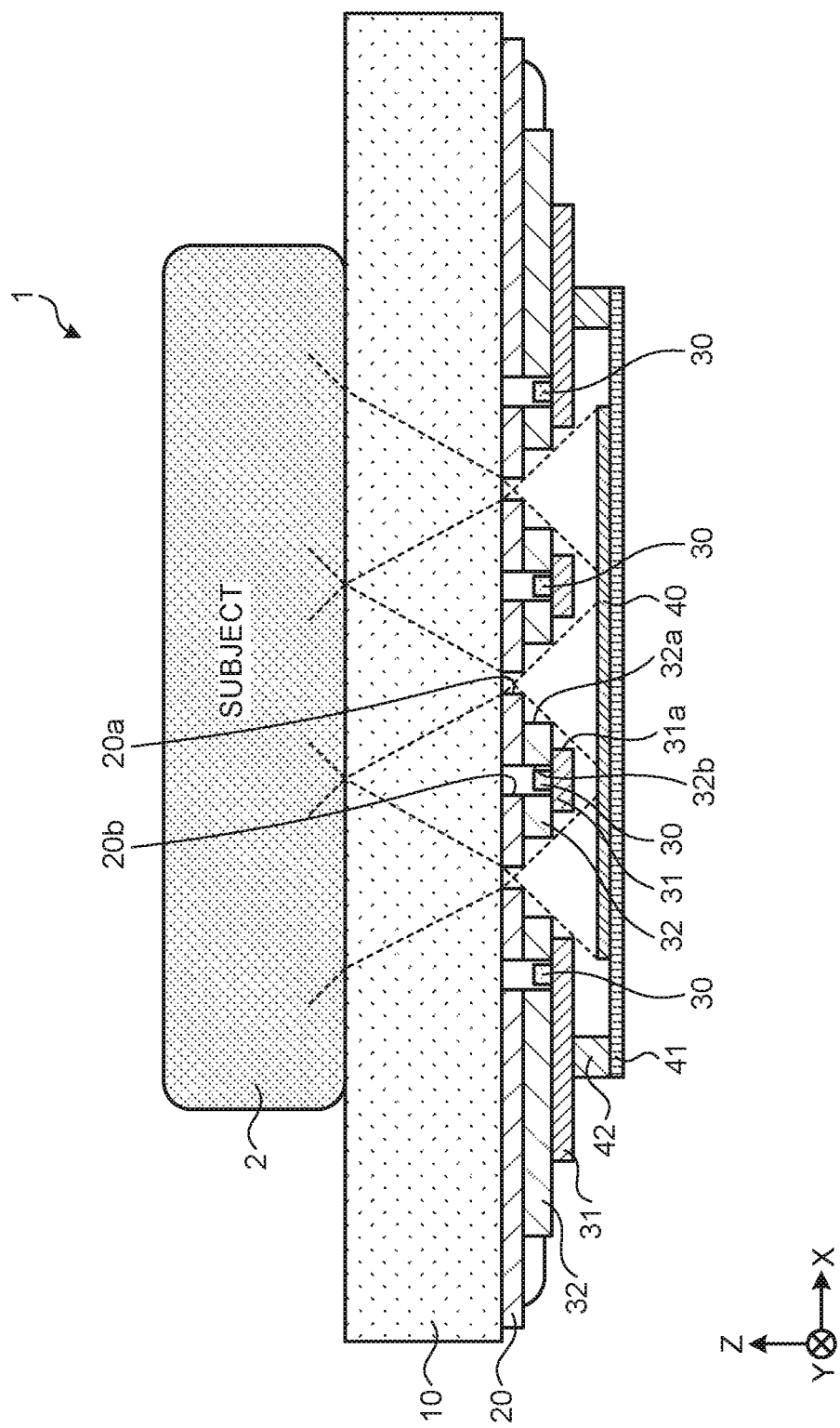
FIG. 3 is a diagram illustrating an example of a schematic configuration of the imaging device.

FIG. 3 is a diagram illustrating an example of a schematic configuration of an imaging device. In the example illustrated in FIG. 3, light from the subject 2 is received by the imaging element 40 in a state where the subject 2 is in contact with the transparent layer 10 of the imaging device 1, and the subject 2 is imaged. The transparent layer 10 has a thickness that gives the shortest distance from the element layer 20 (from the image forming element 20a) to the subject 2. In other words, in the transparent layer 10 in FIG. 2 described above, it is not necessary to provide such a shortest distance, and accordingly, the transparent layer 10 can be thinned, and as such the imaging device 1 can be downsized (thinned or the like).

In one embodiment, the plurality of image forming elements 20a may be arranged according to various patterns. This will be described with reference to FIGS. 4 to 6.

Figure 4:
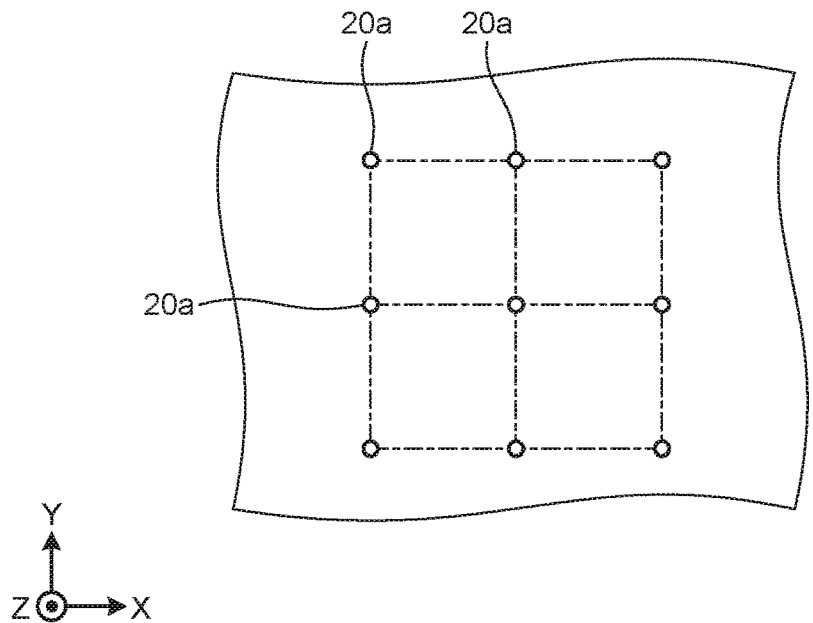
FIG. 4 is a diagram illustrating an example of arrangement of image forming elements.
Figure 5:
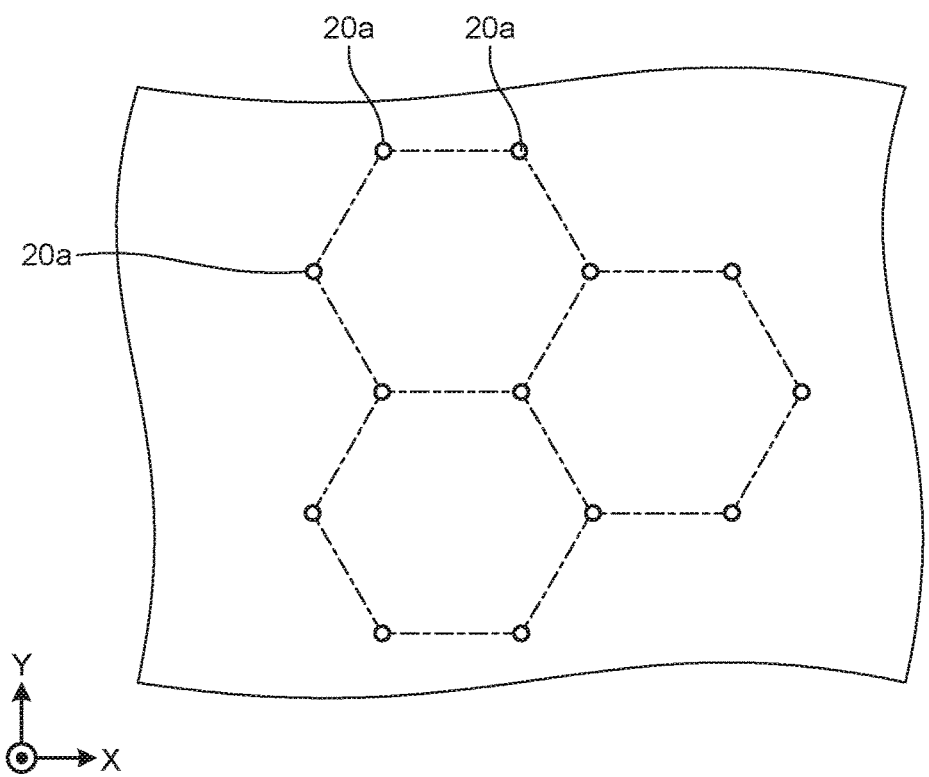
FIG. 5 is a diagram illustrating an example of arrangement of the image forming elements.
Figure 6:
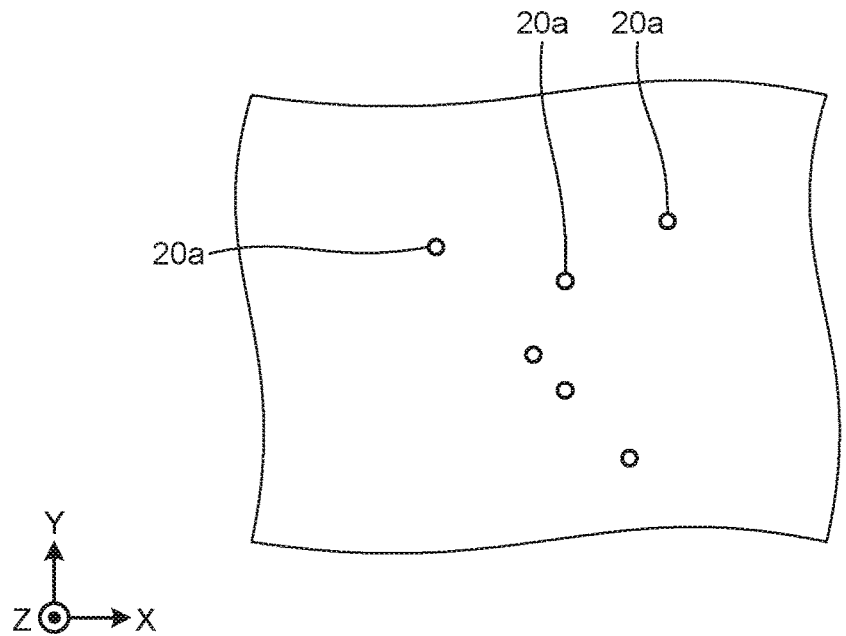
FIG. 6 is a diagram illustrating an example of arrangement of the image forming elements.

FIGS. 4 to 6 are diagrams illustrating an example of arrangement of image forming elements. In the example illustrated in FIGS. 4 and 5, the plurality of image forming elements 20a are regularly arranged. The shape on which the arrangement pattern is based is virtually indicated by an alternate long and short dash line. In this example, the plurality of image forming elements 20a are arranged at vertices of a plurality of polygons provided side by side so that adjacent polygons are in contact with each other (so as to share sides). As a polygon, a quadrangle is illustrated in FIG. 4, and a hexagon is illustrated in FIG. 5. Alternatively, as illustrated in FIG. 6, the plurality of image forming elements 20a may be arranged irregularly (randomly). For example, the image forming element 20a may be arranged in a gap of a wiring of the illumination element 30 (LED or the like). In this case, even if images formed by the image forming element 20a overlap each other, separation by post-processing becomes easy.

In one embodiment, the opening 20b may be smaller than the corresponding illumination element 30. This will be described with reference to FIGS. 7 and 8.

Figure 7:
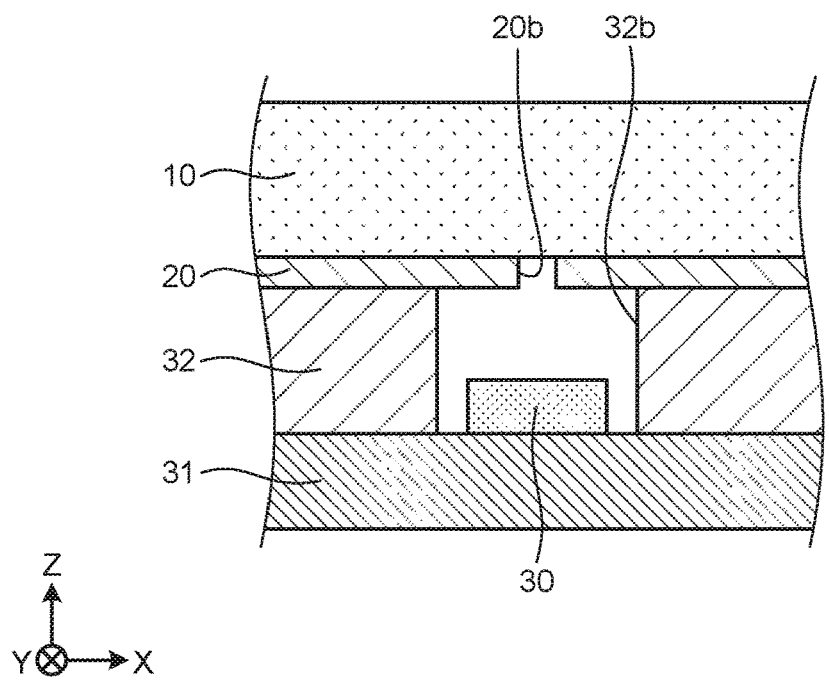
FIG. 7 is a diagram illustrating an example of a schematic configuration of an opening.
Figure 8:
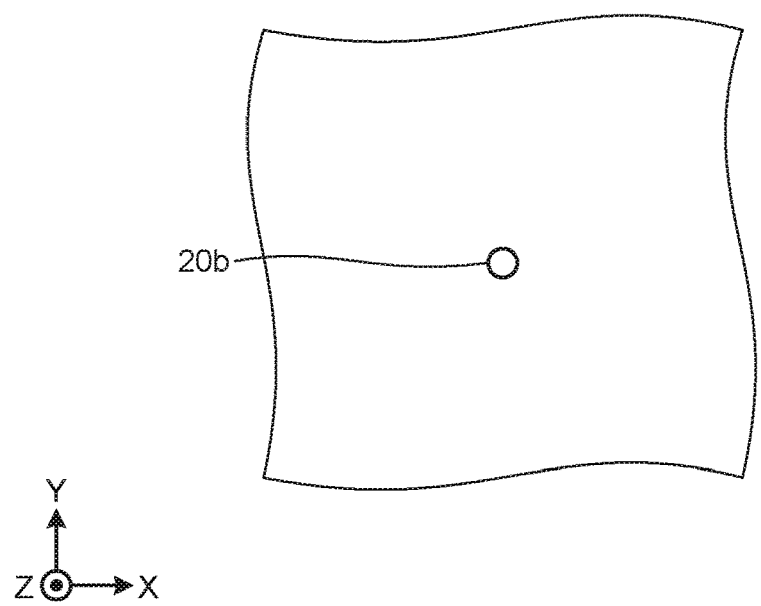
FIG. 8 is a diagram illustrating an example of a schematic configuration of the opening.

FIGS. 7 and 8 are diagrams illustrating an example of a schematic configuration of an opening. In the example illustrated in FIGS. 7 and 8, the opening 20b is smaller than the illumination element 30 when viewed in the forward-and-rearward direction. The size of the opening 20b may be about the same as the size of a hole forming the image forming element 20a which is a pinhole or a photon sieve. By forming such a small hole as the opening 20b, it is possible to make a structure related to illumination, that is, the opening 20b and the illumination element 30 hardly visible when the imaging device 1 is viewed from the front. A higher texture can be given to the surface of the imaging device 1.

In one embodiment, a plurality of openings 20b may be provided for one illumination element 30. This will be described with reference to FIGS. 9 to 11.

Figure 9:
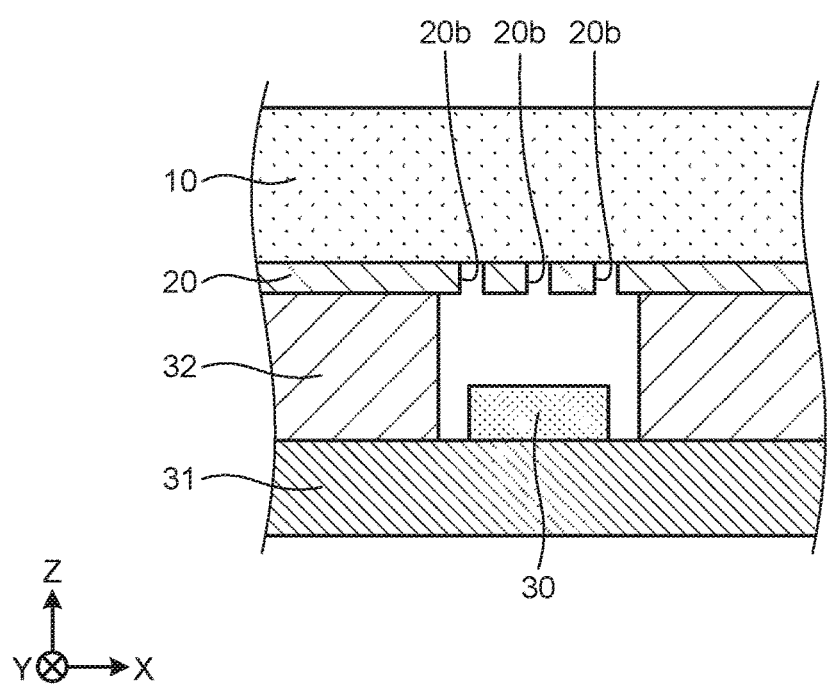
FIG. 9 is a diagram illustrating an example of a schematic configuration of the opening.
Figure 10:
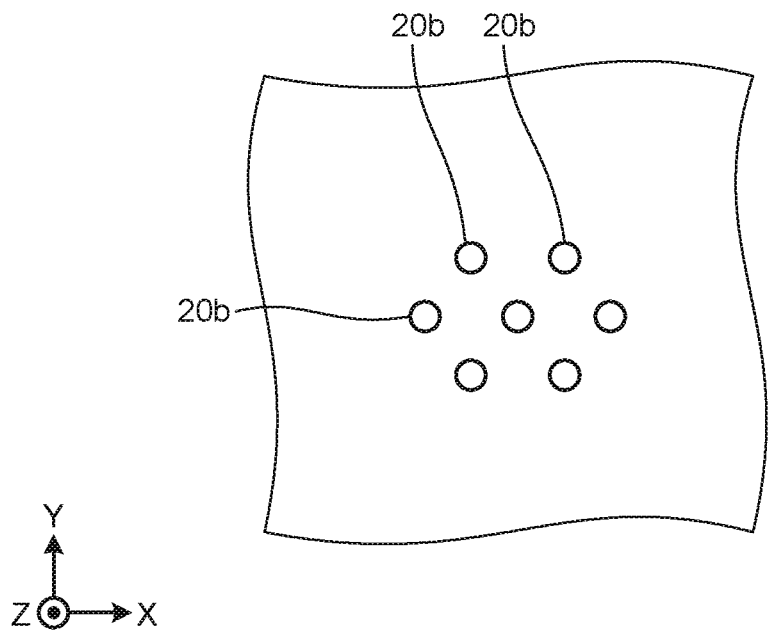
FIG. 10 is a diagram illustrating an example of a schematic configuration of the opening.
Figure 11:
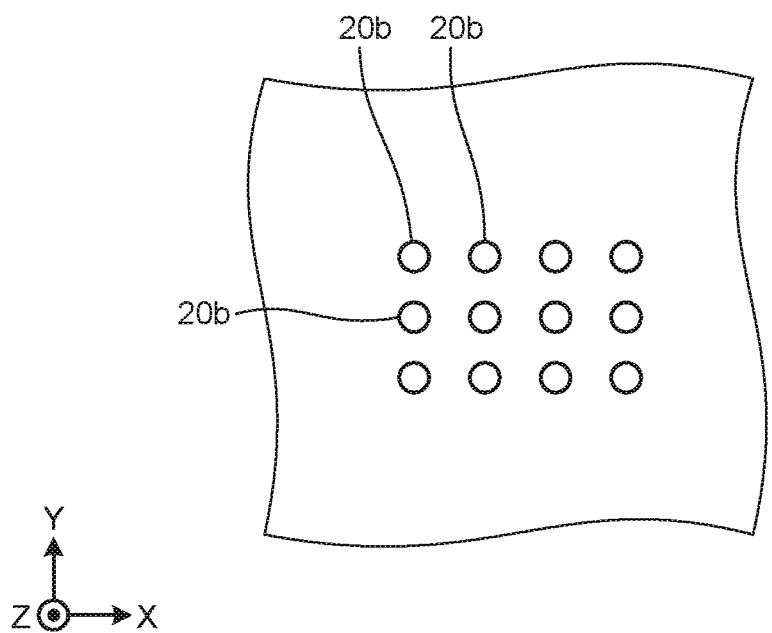
FIG. 11 is a diagram illustrating an example of a schematic configuration of the opening.

FIGS. 9 to 11 are diagrams illustrating an example of a schematic configuration of an opening. As illustrated in FIG. 9, the element layer 20 includes the plurality of openings 20b provided in front of one illumination element 30. The plurality of openings 20b are arranged according to various arrangement patterns. In the example illustrated in FIG. 10, the plurality of openings 20b are arranged at the vertices and center points of a virtual hexagon. In the example illustrated in FIG. 11, the plurality of openings 20b are arranged in an array of three rows and four columns. By providing the plurality of openings 20b for one illumination element 30, for example, the subject 2 can be irradiated with more light from the illumination element 30 than in a case where only one opening 20b is provided as in FIGS. 7 and 8 described above. The illumination efficiency can be improved while maintaining the texture of the surface of the imaging device 1. Further, by devising the arrangement pattern of the plurality of openings 20b, it is also possible to control (adjust or the like) directional control of illumination.

In one embodiment, an element layer may include not only an image forming element but also an illumination element. Such an element layer is obtained by using a self-luminous panel having translucency (transmissive type self-luminous display or the like). An example of the self-luminous panel is an organic light emitting diode (OLED) panel. Specifically, a description will be given with reference to FIGS. 12 to 14.

Figure 12:
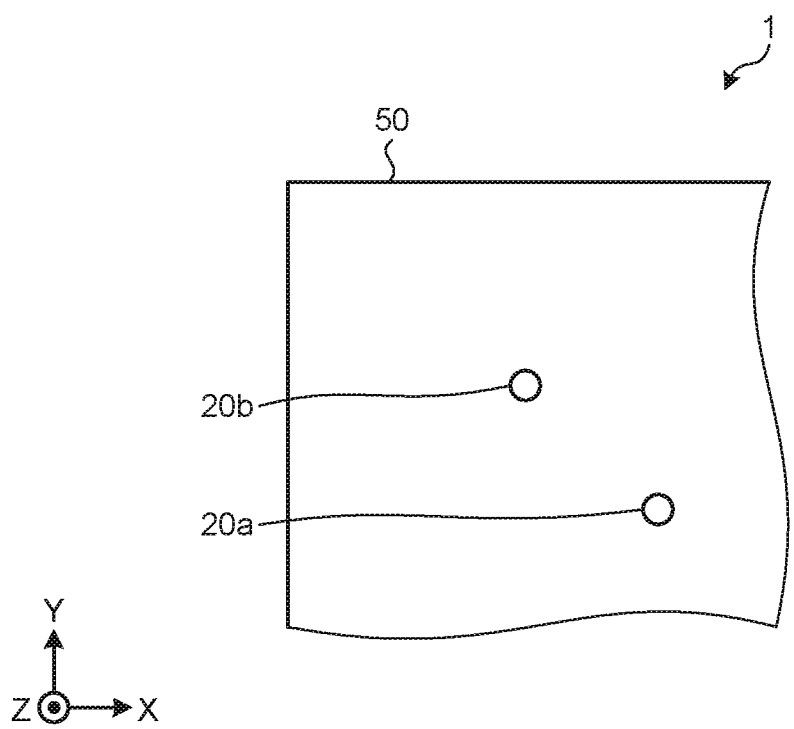
FIG. 12 is a diagram illustrating an example of a schematic configuration of an imaging device.
Figure 13:
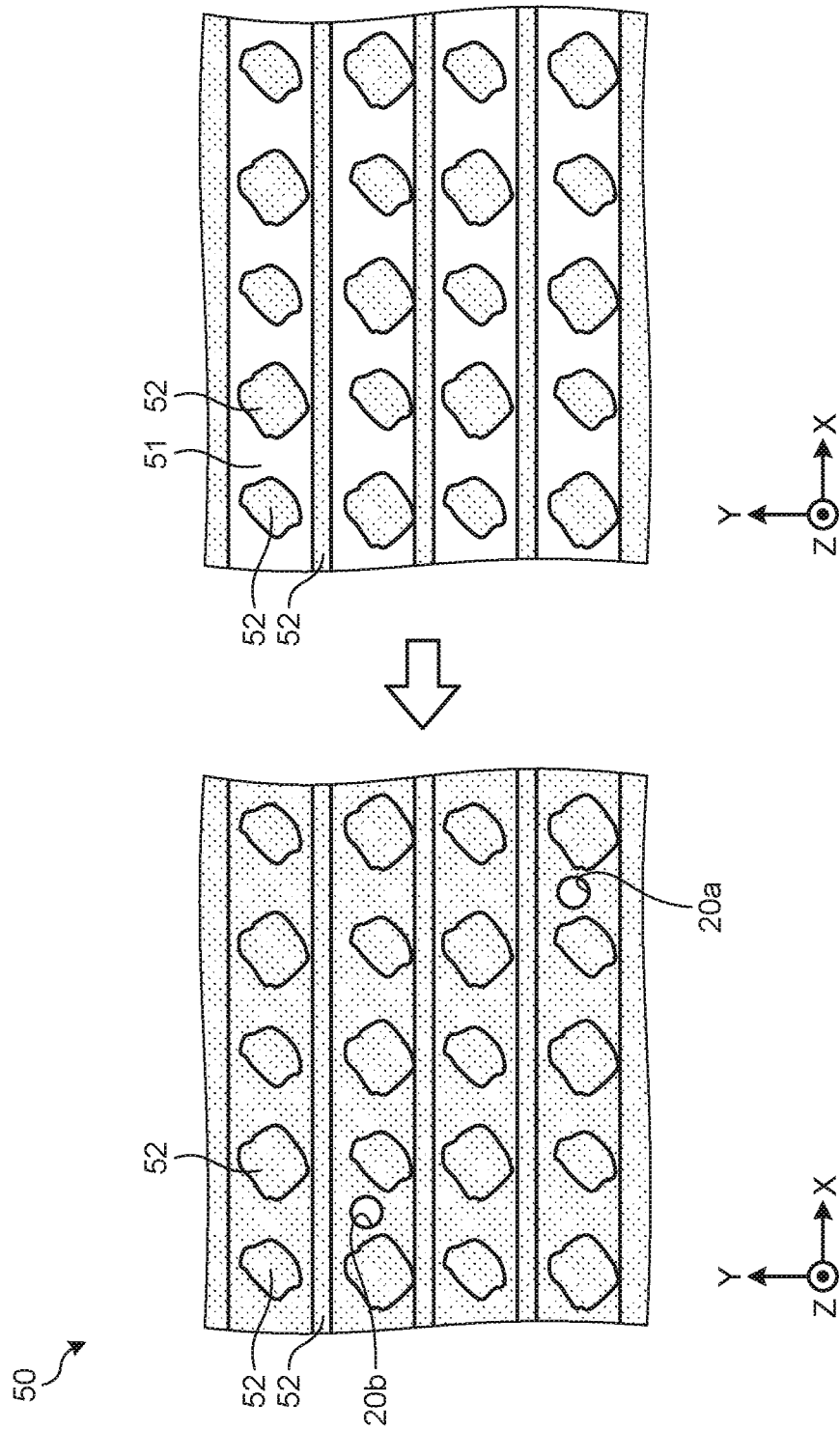
FIG. 13 is a diagram illustrating an example of a schematic configuration of the imaging device.

FIGS. 12 to 14 are diagrams illustrating an example of a schematic configuration of an imaging device. In the example illustrated in FIG. 12, the imaging device 1 includes an OLED panel 50. The OLED panel 50 functions as an element layer including the image forming element 20a and the illumination element 30 (the opening 20b corresponding to the illumination element 30 appears in the drawing). A method of implementing such an element layer in the OLED panel 50 will be described with reference to FIG. 13.

As illustrated on the right side of FIG. 13, a typical OLED panel includes a light-transmitting region 51 and a non-light-transmitting region 52.

The light-transmitting region 51 is a region in which a light-emitting layer, another transparent layer, and the like (not illustrated) are exposed. It is noted that when the OLED panel is a display panel, an interval between the adjacent light-transmitting regions 51 corresponds to a pixel interval. An example of the pixel interval is about several tens of μm. The emission of the light-emitting layer provides illumination light.

The non-light-transmitting region 52 is a region in which a light-emitting layer and a wiring pattern of a wiring layer (not illustrated) exist. An example of the wiring pattern is a wiring pattern of a thin film transistor (TFT). By combining the light-emitting layer and the wiring pattern of the wiring layer, (the openings 20b corresponding to) the image forming element 20a and the illumination element 30 can be formed on the OLED panel 50.

The image forming element 20a is formed of the wiring pattern of the wiring layer, the TFT, and the like. This layer is usually configured in the same layer as the light-emitting layer of the OLED or in the lower (rear) layer. For example, as illustrated on the left side of FIG. 13, the image forming element 20a of the OLED panel 50 is formed by leaving a part of the light-transmitting region 51 exposed and setting the other region as a region provided with a wiring pattern by a wiring layer (non-light-transmitting region). The light passing through the image forming element 20a is received by the imaging element 40 as described above. It is noted that the wiring pattern for generating the non-light-transmitting region does not need to actually form a circuit.

The illumination element 30 and the corresponding opening 20b are formed by combining light emission by the light-emitting layer and the wiring pattern of the wiring layer. Since it is not necessary to narrow the opening of the illumination in the normal OLED panel, the upper portion of a light emitting unit may be entirely opened. The subject 2 is irradiated with light through the opening.

The light shielding portion that shields light from the illumination element to the imaging element 40 described above can also be formed using the wiring pattern of the wiring layer.

It is noted that the illumination element 30 (light-emitting layer) in the OLED panel 50 may be positioned almost identically or negligibly in front of the wiring layer (image forming element 20a) in the forward-and-rearward direction. In such a configuration as well, it can be said that the illumination element is provided at the same position as that of the element layer.

By using the panel such as the OLED panel 50 as described above, it is possible to simultaneously obtain the functions of both the image forming element 20a and the illumination element 30. Since the element layer is configured to include not only the image forming element 20a but also the illumination element 30, the possibility that the imaging device 1 can be downsized (thinned or the like) is further increased accordingly.

In one embodiment, the image forming element 20a may be formed over the plurality of light-transmitting regions 51 and the plurality of non-light-transmitting regions 52 in the OLED panel 50. This will be described with reference to FIG. 14.

In the example illustrated in FIG. 14, the image forming element 20a is a Fresnel zone plate formed over the plurality of light-transmitting regions 51 and the plurality of non-light-transmitting regions 52 in the OLED panel 50. An overlapping region between the light-transmitting region in the Fresnel zone plate and the light-transmitting region 51 in the OLED panel 50 becomes a light-transmitting region in the image forming element 20a. The non-light-transmitting region of the Fresnel zone plate and/or the non-light-transmitting region 52 of the OLED panel 50 become a non-light-transmitting region in the image forming element 20a. Such an image forming element 20a can also function as a Fresnel zone plate or a photon sieve. For example, by using the Fresnel zone plate as the image forming element 20a, for example, light transmittance can be improved, and a brighter image can be obtained.

3. Application Example

Some applications of the imaging device 1 described above will be described with reference to FIGS. 15 to 18.

FIGS. 15 to 18 are diagrams illustrating examples of applications of the imaging device.

For example, the imaging device 1 may be mounted on various electronic devices and used. The imaging device 1 that can be downsized (thickness reduction, area reduction, and the like) is suitably mounted on, for example, a mobile terminal device or the like. Examples of the mobile terminal device include a smartphone, a tablet terminal, a laptop, and a wearable terminal (smart glasses or the like).

Figure 15:
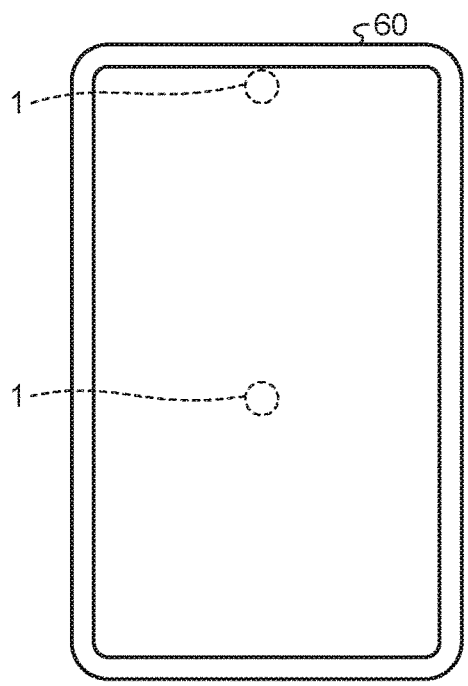
FIG. 15 is a diagram illustrating an example of an application of the imaging device.
Figure 16:
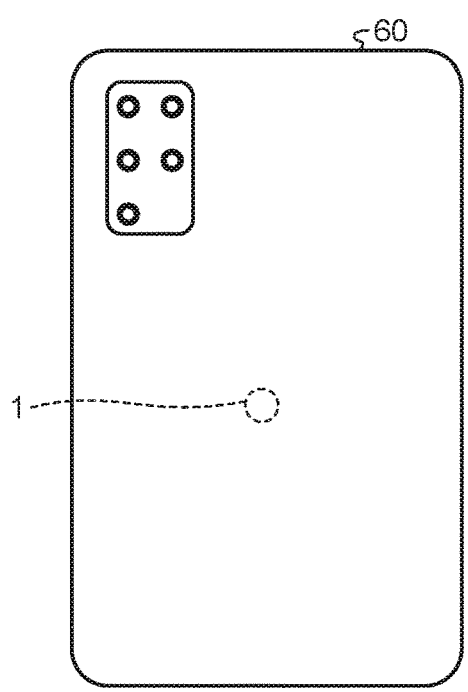
FIG. 16 is a diagram illustrating an example of an application of the imaging device.

The electronic device illustrated in FIGS. 15 and 16 is a smartphone 60. In the example illustrated in FIG. 15, the imaging device 1 is mounted on the smartphone 60 so as to receive light from the front side of the smartphone 60. For example, the display of the smartphone 60 includes an OLED panel, and the imaging device 1 is configured using the OLED panel as described above. The imaging device 1 functions as a fingerprint imaging device provided behind (immediately behind) the OLED.

For example, while the imaging device 1 is disposed at an end portion on the front side of the smartphone 60 like a front camera, almost the entire front surface of the smartphone 60 can be used as a display. It is also possible to dispose the imaging device 1 at any position such as a central portion of the display. In a case where the image forming element 20a is, for example, a pinhole, a deep depth of field is obtained, so that not only the fingerprint can be imaged by close-up photography but also a distant subject can be imaged. The imaging device 1 can also be used as an imaging device for face authentication, gesture control, and the like. When the imaging device 1 is disposed at the center of the display, not only it is easy to place a finger for fingerprint authentication, but also there is an advantage that it is easy to perform gaze alignment when taking a selfie while looking at the display.

In the example illustrated in FIG. 16, the imaging device 1 is mounted on the smartphone 60 so as to receive light from the back side of the smartphone 60. The imaging device 1 is provided, for example, on the back side of the glass-coated surface, metal, or another material of the smartphone 60. As a result, the imaging device 1 can be provided as a fingerprint imaging device by close-up photography without impairing texture or the like of the surface. A mark or the like may be provided to direct (guide) the finger to an appropriate position at the time of fingerprint authentication. An example of the mark is unevenness or the like provided on the back side of the smartphone 60.

Figure 17:
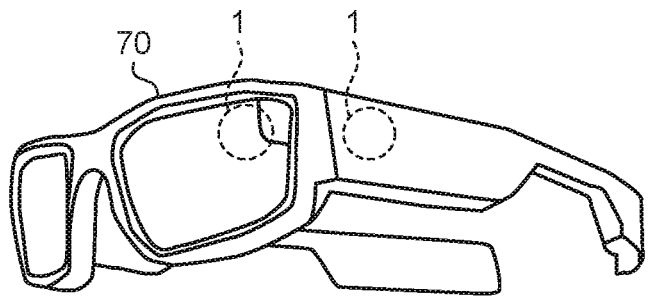
FIG. 17 is a diagram illustrating an example of an application of the imaging device.
Figure 18:
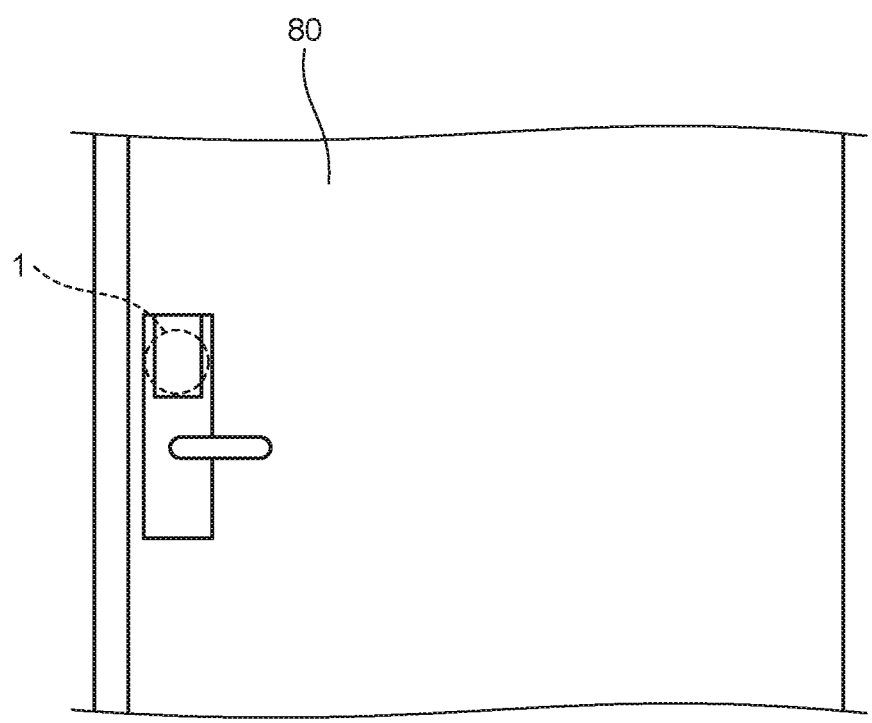
FIG. 18 is a diagram illustrating an example of an application of the imaging device.

In the example illustrated in FIG. 17, the imaging device 1 is mounted on smart glasses 70. The imaging device 1 is provided in a side portion of the smart glasses 70, a lower portion of the glass, or the like. The imaging device 1, the image forming element 20a, and the like can be hardly visible from the outside. The imaging device 1 can be used as a fingerprint imaging device by close-up photography, an imaging device for recognition of a surrounding environment, a gesture control sensor by non-contact, and the like.

The imaging device 1 may be provided in various objects other than an electronic device. In the example illustrated in FIG. 18, the imaging device 1 is provided on a door 80. An example of the door 80 is a front door, and in this case, the imaging device 1 is used as a fingerprint imaging device for unlocking. The imaging device 1 is provided on a part of a place covered with a material of the entire door 80, in this example, on a door knob. It is noted that, in a case where the door 80 is an automatic door, a door knob is unnecessary, and the imaging device 1 is provided in another portion. It is also possible to obtain the door 80 made of a material having a uniform entire surface.

4. Application Example to Moving Body

The technology according to the present disclosure (present technology) can be applied to various products. For example, the technology according to the present disclosure may be implemented as a device mounted on any type of moving body such as an automobile, an electric vehicle, a hybrid electric vehicle, a motorcycle, a bicycle, a personal mobility, an airplane, a drone, a ship, and a robot.

Figure 19:
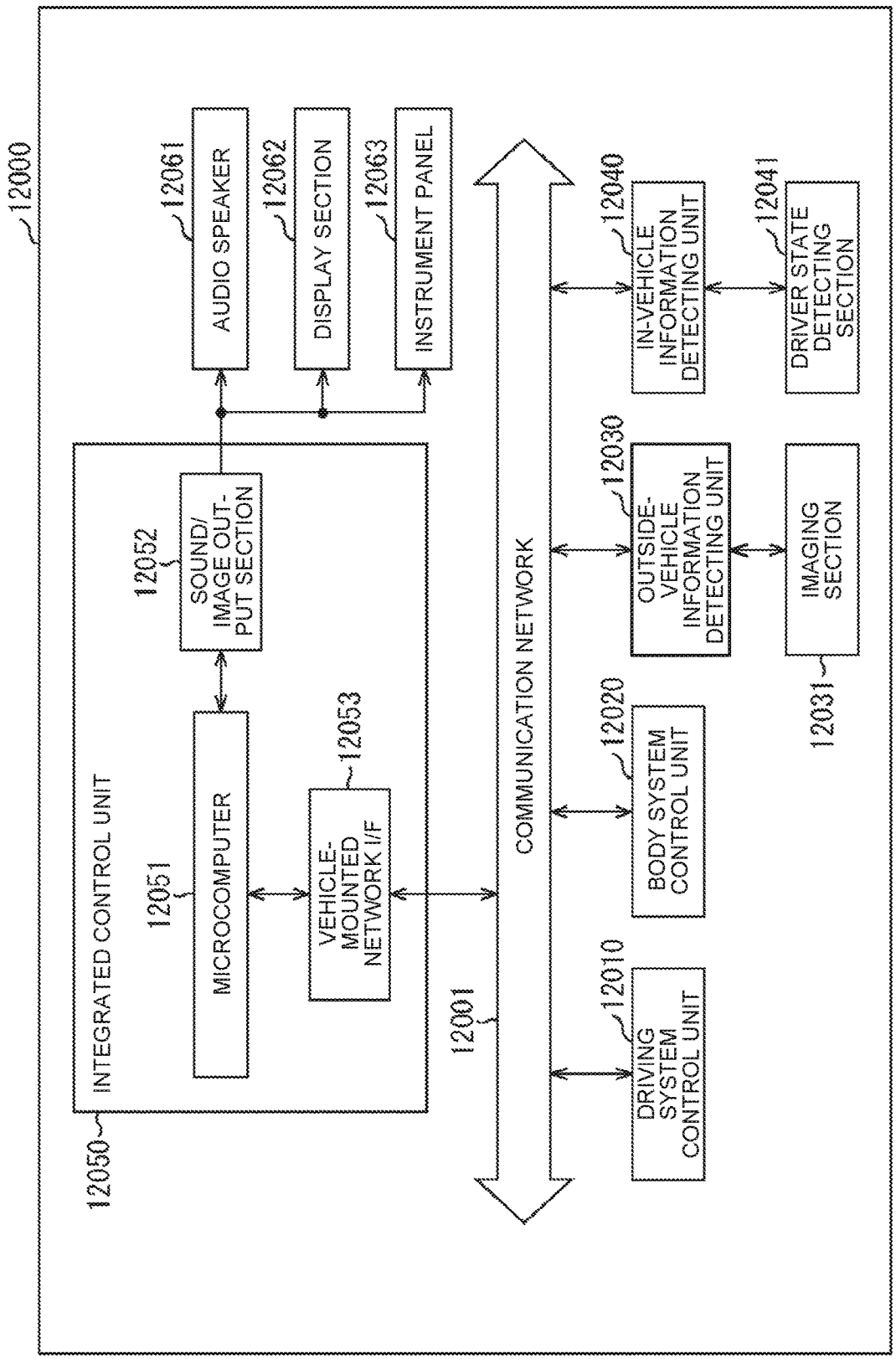
FIG. 19 is a block diagram depicting an example of schematic configuration of a vehicle control system.

FIG. 19 is a block diagram illustrating a schematic configuration example of a vehicle control system, which is an example of a moving body control system to which the technology according to the present disclosure can be applied.

The vehicle control system 12000 includes a plurality of electronic control units connected to each other via a communication network 12001. In the example depicted in FIG. 19, the vehicle control system 12000 includes a driving system control unit 12010, a body system control unit 12020, an outside-vehicle information detecting unit 12030, an in-vehicle information detecting unit 12040, and an integrated control unit 12050. In addition, a microcomputer 12051, a sound/image output section 12052, and a vehicle-mounted network interface (I/F) 12053 are illustrated as a functional configuration of the integrated control unit 12050.

The driving system control unit 12010 controls the operation of devices related to the driving system of the vehicle in accordance with various kinds of programs. For example, the driving system control unit 12010 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like.

The body system control unit 12020 controls the operation of various kinds of devices provided to a vehicle body in accordance with various kinds of programs. For example, the body system control unit 12020 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 12020. The body system control unit 12020 receives these input radio waves or signals, and controls a door lock device, the power window device, the lamps, or the like of the vehicle.

The outside-vehicle information detecting unit 12030 detects information about the outside of the vehicle including the vehicle control system 12000. For example, the outside-vehicle information detecting unit 12030 is connected with an imaging section 12031. The outside-vehicle information detecting unit 12030 makes the imaging section 12031 image an image of the outside of the vehicle, and receives the imaged image. On the basis of the received image, the outside-vehicle information detecting unit 12030 may perform processing of detecting an object such as a human, a vehicle, an obstacle, a sign, a character on a road surface, or the like, or processing of detecting a distance thereto.

The imaging section 12031 is an optical sensor (imaging element) that receives light, and which outputs an electric signal corresponding to a received light amount of the light. The imaging section 12031 can output the electric signal as an image, or can output the electric signal as information about a measured distance. In addition, the light received by the imaging section 12031 may be visible light, or may be invisible light such as infrared rays or the like.

The in-vehicle information detecting unit 12040 detects information about the inside of the vehicle. The in-vehicle information detecting unit 12040 is, for example, connected with a driver state detecting section 12041 that detects the state of a driver. The driver state detecting section 12041, for example, includes a camera that images the driver. On the basis of detection information input from the driver state detecting section 12041, the in-vehicle information detecting unit 12040 may calculate a degree of fatigue of the driver or a degree of concentration of the driver, or may determine whether the driver is dozing.

The microcomputer 12051 can calculate a control target value for the driving force generating device, the steering mechanism, or the braking device on the basis of the information about the inside or outside of the vehicle which information is obtained by the outside-vehicle information detecting unit 12030 or the in-vehicle information detecting unit 12040, and output a control command to the driving system control unit 12010. For example, the microcomputer 12051 can perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like.

In addition, the microcomputer 12051 can perform cooperative control intended for automated driving, which makes the vehicle to travel automatedly without depending on the operation of the driver, or the like, by controlling the driving force generating device, the steering mechanism, the braking device, or the like on the basis of the information about the outside or inside of the vehicle which information is obtained by the outside-vehicle information detecting unit 12030 or the in-vehicle information detecting unit 12040.

In addition, the microcomputer 12051 can output a control command to the body system control unit 12020 on the basis of the information about the outside of the vehicle which information is obtained by the outside-vehicle information detecting unit 12030. For example, the microcomputer 12051 can perform cooperative control intended to prevent a glare by controlling the headlamp so as to change from a high beam to a low beam, for example, in accordance with the position of a preceding vehicle or an oncoming vehicle detected by the outside-vehicle information detecting unit 12030.

The sound/image output section 12052 transmits an output signal of at least one of a sound and an image to an output device capable of visually or auditorily notifying information to an occupant of the vehicle or the outside of the vehicle. In the example of FIG. 19, an audio speaker 12061, a display section 12062, and an instrument panel 12063 are illustrated as the output device. The display section 12062 may, for example, include at least one of an on-board display and a head-up display.

Figure 20:
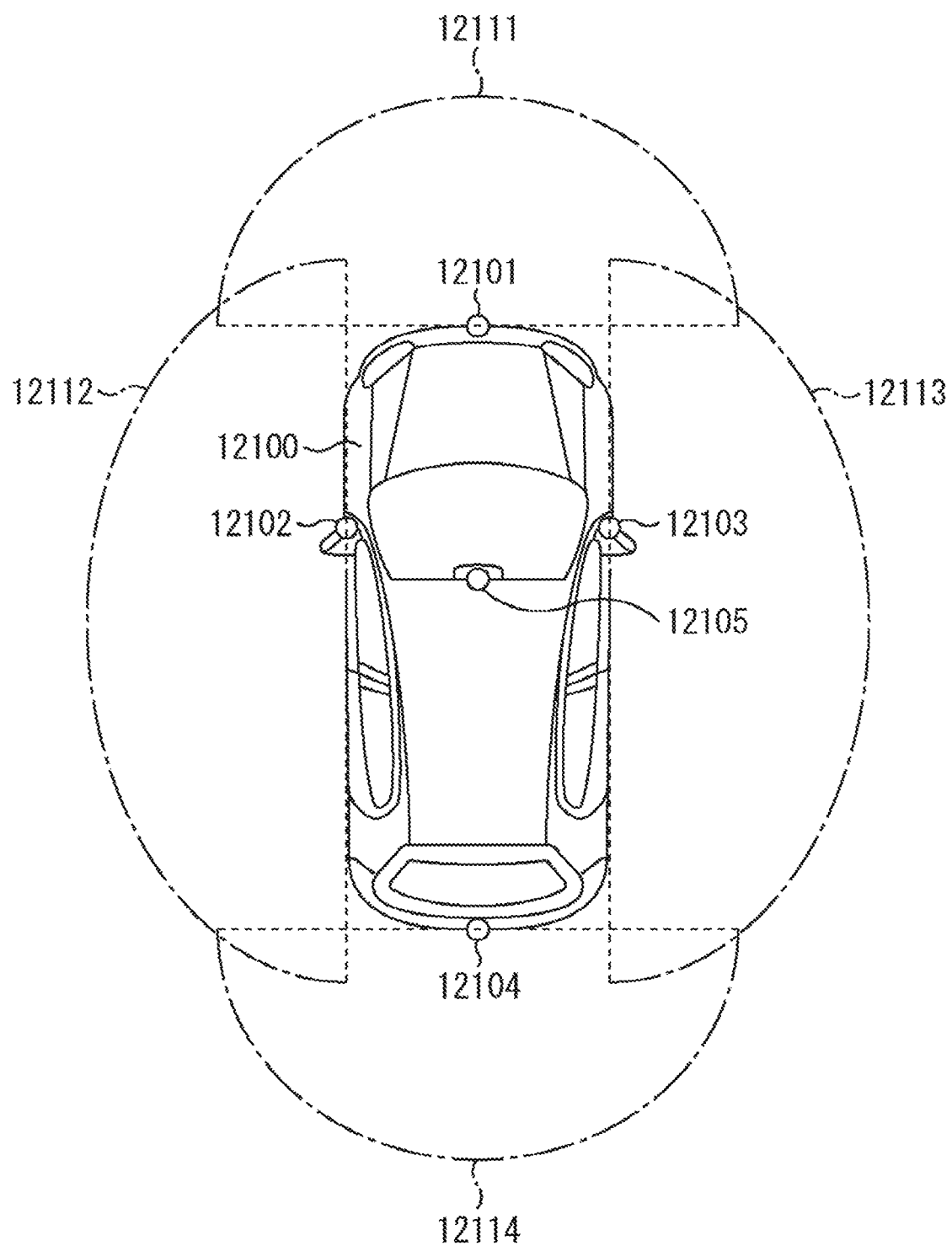
FIG. 20 is a diagram of assistance in explaining an example of installation positions of an outside-vehicle information detecting section and an imaging section.

FIG. 20 is a diagram depicting an example of the installation position of the imaging section 12031.

In FIG. 20, the imaging section 12031 includes imaging sections 12101, 12102, 12103, 12104, and 12105.

The imaging sections 12101, 12102, 12103, 12104, and 12105 are, for example, disposed at positions on a front nose, sideview mirrors, a rear bumper, and a back door of the vehicle 12100 as well as a position on an upper portion of a windshield within the interior of the vehicle. The imaging section 12101 provided to the front nose and the imaging section 12105 provided to the upper portion of the windshield within the interior of the vehicle obtain mainly an image of the front of the vehicle 12100. The imaging sections 12102 and 12103 provided to the sideview mirrors obtain mainly an image of the sides of the vehicle 12100. The imaging section 12104 provided to the rear bumper or the back door obtains mainly an image of the rear of the vehicle 12100. The imaging section 12105 provided to the upper portion of the windshield within the interior of the vehicle is used mainly to detect a preceding vehicle, a pedestrian, an obstacle, a signal, a traffic sign, a lane, or the like.

Incidentally, FIG. 20 depicts an example of photographing ranges of the imaging sections 12101 to 12104. An imaging range 12111 represents the imaging range of the imaging section 12101 provided to the front nose. Imaging ranges 12112 and 12113 respectively represent the imaging ranges of the imaging sections 12102 and 12103 provided to the sideview mirrors. An imaging range 12114 represents the imaging range of the imaging section 12104 provided to the rear bumper or the back door. A bird's-eye image of the vehicle 12100 as viewed from above is obtained by superimposing image data imaged by the imaging sections 12101 to 12104, for example.

At least one of the imaging sections 12101 to 12104 may have a function of obtaining distance information. For example, at least one of the imaging sections 12101 to 12104 may be a stereo camera constituted of a plurality of imaging elements, or may be an imaging element having pixels for phase difference detection.

For example, the microcomputer 12051 can determine a distance to each three-dimensional object within the imaging ranges 12111 to 12114 and a temporal change in the distance (relative speed with respect to the vehicle 12100) on the basis of the distance information obtained from the imaging sections 12101 to 12104, and thereby extract, as a preceding vehicle, a nearest three-dimensional object in particular that is present on a traveling path of the vehicle 12100 and which travels in substantially the same direction as the vehicle 12100 at a predetermined speed (for example, equal to or more than 0 km/hour). Further, the microcomputer 12051 can set a following distance to be maintained in front of a preceding vehicle in advance, and perform automatic brake control (including following stop control), automatic acceleration control (including following start control), or the like. It is thus possible to perform cooperative control intended for automated driving that makes the vehicle travel automatedly without depending on the operation of the driver or the like.

For example, the microcomputer 12051 can classify three-dimensional object data on three-dimensional objects into three-dimensional object data of a two-wheeled vehicle, a standard-sized vehicle, a large-sized vehicle, a pedestrian, a utility pole, and other three-dimensional objects on the basis of the distance information obtained from the imaging sections 12101 to 12104, extract the classified three-dimensional object data, and use the extracted three-dimensional object data for automatic avoidance of an obstacle. For example, the microcomputer 12051 identifies obstacles around the vehicle 12100 as obstacles that the driver of the vehicle 12100 can recognize visually and obstacles that are difficult for the driver of the vehicle 12100 to recognize visually. Then, the microcomputer 12051 determines a collision risk indicating a risk of collision with each obstacle. In a situation in which the collision risk is equal to or higher than a set value and there is thus a possibility of collision, the microcomputer 12051 outputs a warning to the driver via the audio speaker 12061 or the display section 12062, and performs forced deceleration or avoidance steering via the driving system control unit 12010. The microcomputer 12051 can thereby assist in driving to avoid collision.

At least one of the imaging sections 12101 to 12104 may be an infrared camera that detects infrared rays. The microcomputer 12051 can, for example, recognize a pedestrian by determining whether or not there is a pedestrian in imaged images of the imaging sections 12101 to 12104. Such recognition of a pedestrian is, for example, performed by a procedure of extracting characteristic points in the imaged images of the imaging sections 12101 to 12104 as infrared cameras and a procedure of determining whether or not it is the pedestrian by performing pattern matching processing on a series of characteristic points representing the contour of the object. When the microcomputer 12051 determines that there is a pedestrian in the imaged images of the imaging sections 12101 to 12104, and thus recognizes the pedestrian, the sound/image output section 12052 controls the display section 12062 so that a square contour line for emphasis is displayed so as to be superimposed on the recognized pedestrian. The sound/image output section 12052 may also control the display section 12062 so that an icon or the like representing the pedestrian is displayed at a desired position.

An example of the vehicle control system to which the technology according to the present disclosure can be applied has been described above. The technology according to the present disclosure can be applied to the imaging section 12031 among the configurations described above. By applying the technology according to the present disclosure to the imaging section 12031, for example, a compact mounting of an imaging device on a system becomes possible.

5. Application Example to Endoscopic Surgery System

The technology according to the present disclosure (present technology) can be applied to various products. For example, the technology according to the present disclosure may be applied to an endoscopic surgery system.

Figure 21:
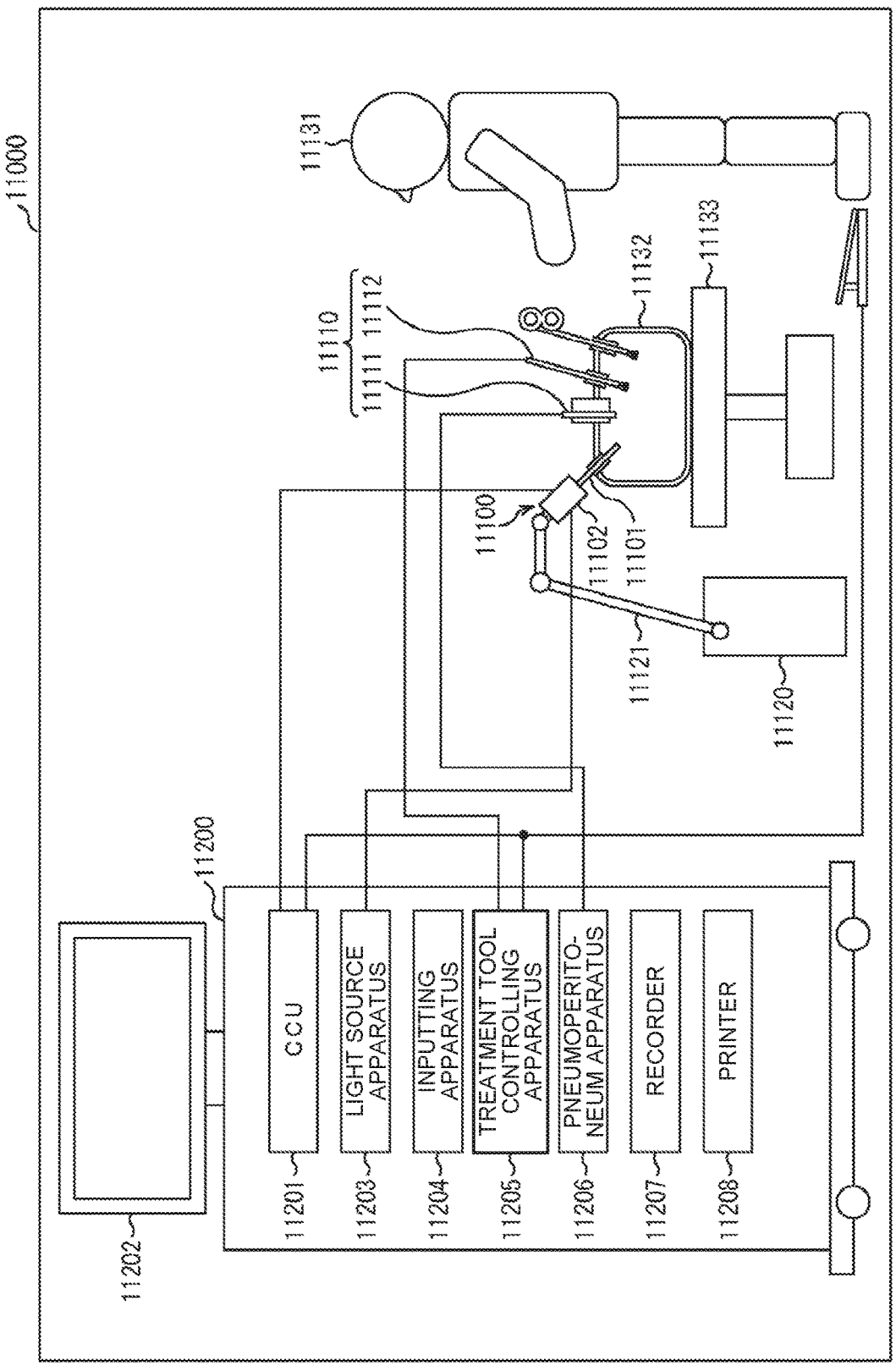
FIG. 21 is a view depicting an example of a schematic configuration of an endoscopic surgery system.

FIG. 21 is a view depicting an example of a schematic configuration of an endoscopic surgery system to which the technology according to an embodiment of the present disclosure (present technology) can be applied.

In FIG. 21, a state is illustrated in which a surgeon (medical doctor) 11131 is using an endoscopic surgery system 11000 to perform surgery for a patient 11132 on a patient bed 11133. As depicted, the endoscopic surgery system 11000 includes an endoscope 11100, other surgical tools 11110 such as a pneumoperitoneum tube 11111 and an energy treatment tool 11112, a supporting arm apparatus 11120 which supports the endoscope 11100 thereon, and a cart 11200 on which various apparatus for endoscopic surgery are mounted.

The endoscope 11100 includes a lens barrel 11101 having a region of a predetermined length from a distal end thereof to be inserted into a body lumen of the patient 11132, and a camera head 11102 connected to a proximal end of the lens barrel 11101. In the example depicted, the endoscope 11100 is depicted which includes as a hard mirror having the lens barrel 11101 of the hard type. However, the endoscope 11100 may otherwise be included as a soft mirror having the lens barrel 11101 of the soft type.

The lens barrel 11101 has, at a distal end thereof, an opening in which an objective lens is fitted. A light source apparatus 11203 is connected to the endoscope 11100 such that light generated by the light source apparatus 11203 is introduced to a distal end of the lens barrel 11101 by a light guide extending in the inside of the lens barrel 11101 and is irradiated toward an observation target in a body lumen of the patient 11132 through the objective lens. It is to be noted that the endoscope 11100 may be a direct view mirror or may be a perspective view mirror or a side view mirror.

An optical system and an image pickup element are provided in the inside of the camera head 11102 such that reflected light (observation light) from the observation target is condensed on the image pickup element by the optical system. The observation light is photo-electrically converted by the image pickup element to generate an electric signal corresponding to the observation light, namely, an image signal corresponding to an observation image. The image signal is transmitted as RAW data to a CCU 11201.

The CCU 11201 includes a central processing unit (CPU), a graphics processing unit (GPU) or the like and integrally controls operation of the endoscope 11100 and a display apparatus 11202. Further, the CCU 11201 receives an image signal from the camera head 11102 and performs, for the image signal, various image processes for displaying an image based on the image signal such as, for example, a development process (demosaic process).

The display apparatus 11202 displays thereon an image based on an image signal, for which the image processes have been performed by the CCU 11201, under the control of the CCU 11201.

The light source apparatus 11203 includes a light source such as, for example, a light emitting diode (LED) and supplies irradiation light upon imaging of a surgical region to the endoscope 11100.

An inputting apparatus 11204 is an input interface for the endoscopic surgery system 11000. A user can perform inputting of various kinds of information or instruction inputting to the endoscopic surgery system 11000 through the inputting apparatus 11204. For example, the user would input an instruction or a like to change an image pickup condition (type of irradiation light, magnification, focal distance or the like) by the endoscope 11100.

A treatment tool controlling apparatus 11205 controls driving of the energy treatment tool 11112 for cautery or incision of a tissue, sealing of a blood vessel or the like. A pneumoperitoneum apparatus 11206 feeds gas into a body lumen of the patient 11132 through the pneumoperitoneum tube 11111 to inflate the body lumen in order to secure the field of view of the endoscope 11100 and secure the working space for the surgeon. A recorder 11207 is an apparatus capable of recording various kinds of information relating to surgery. A printer 11208 is an apparatus capable of printing various kinds of information relating to surgery in various forms such as a text, an image or a graph.

It is to be noted that the light source apparatus 11203 which supplies irradiation light when a surgical region is to be imaged to the endoscope 11100 may include a white light source which includes, for example, an LED, a laser light source or a combination of them. Where a white light source includes a combination of red, green, and blue (RGB) laser light sources, since the output intensity and the output timing can be controlled with a high degree of accuracy for each color (each wavelength), adjustment of the white balance of a picked up image can be performed by the light source apparatus 11203. Further, in this case, if laser beams from the respective RGB laser light sources are irradiated time-divisionally on an observation target and driving of the image pickup elements of the camera head 11102 are controlled in synchronism with the irradiation timings. Then images individually corresponding to the R, G and B colors can be also picked up time-divisionally. According to this method, a color image can be obtained even if color filters are not provided for the image pickup element.

Further, the light source apparatus 11203 may be controlled such that the intensity of light to be outputted is changed for each predetermined time. By controlling driving of the image pickup element of the camera head 11102 in synchronism with the timing of the change of the intensity of light to acquire images time-divisionally and synthesizing the images, an image of a high dynamic range free from underexposed blocked up shadows and overexposed highlights can be created.

Further, the light source apparatus 11203 may be configured to supply light of a predetermined wavelength band ready for special light observation. In special light observation, for example, by utilizing the wavelength dependency of absorption of light in a body tissue to irradiate light of a narrow band in comparison with irradiation light upon ordinary observation (namely, white light), narrow band observation (narrow band imaging) of imaging a predetermined tissue such as a blood vessel of a superficial portion of the mucous membrane or the like in a high contrast is performed. Alternatively, in special light observation, fluorescent observation for obtaining an image from fluorescent light generated by irradiation of excitation light may be performed. In fluorescent observation, it is possible to perform observation of fluorescent light from a body tissue by irradiating excitation light on the body tissue (autofluorescence observation) or to obtain a fluorescent light image by locally injecting a reagent such as indocyanine green (ICG) into a body tissue and irradiating excitation light corresponding to a fluorescent light wavelength of the reagent upon the body tissue. The light source apparatus 11203 can be configured to supply such narrow-band light and/or excitation light suitable for special light observation as described above.

Figure 22:
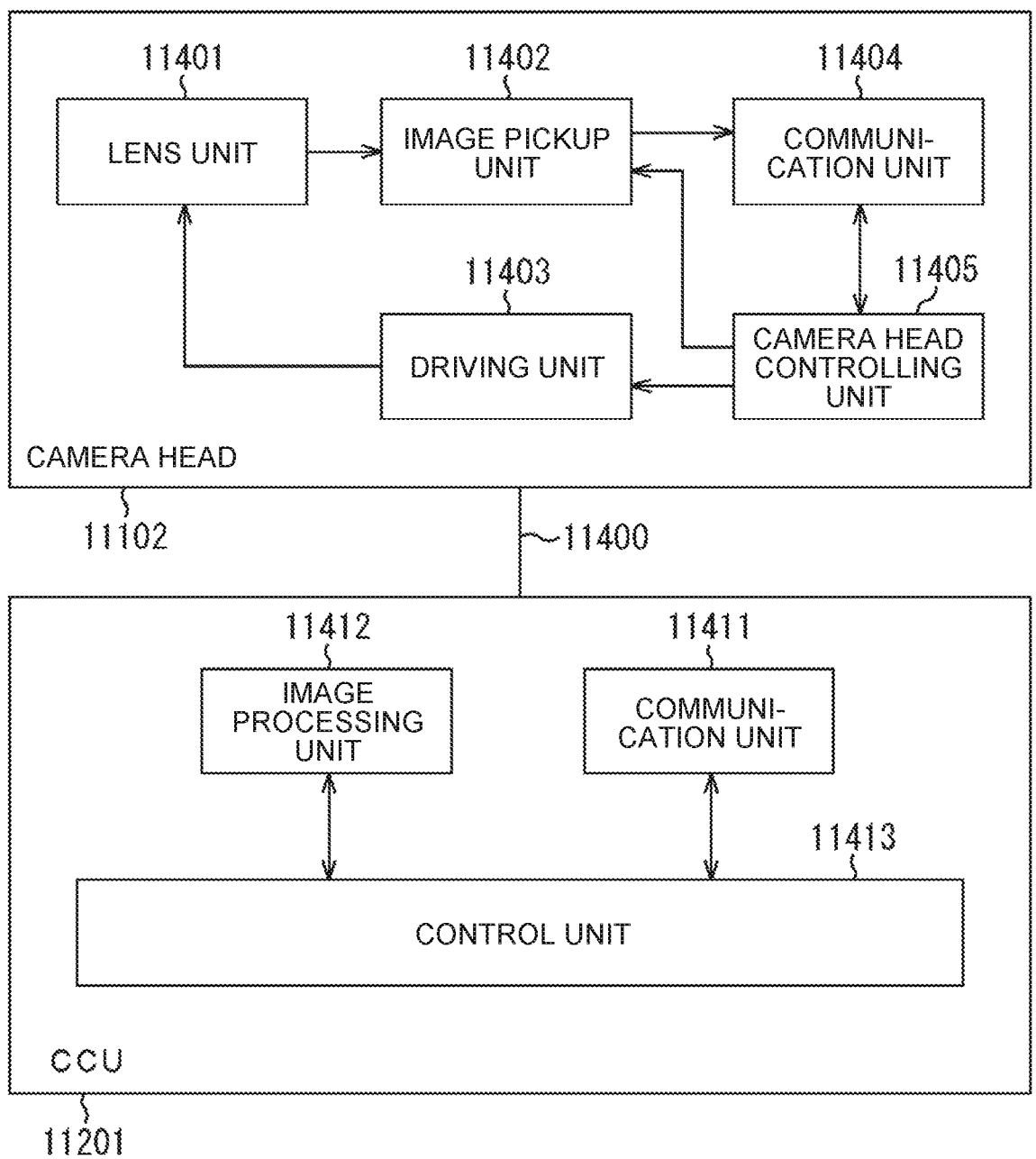
FIG. 22 is a block diagram depicting an example of a functional configuration of a camera head and a camera control unit (CCU).

FIG. 22 is a block diagram depicting an example of a functional configuration of the camera head 11102 and the CCU 11201 depicted in FIG. 21.

The camera head 11102 includes a lens unit 11401, an image pickup unit 11402, a driving unit 11403, a communication unit 11404 and a camera head controlling unit 11405. The CCU 11201 includes a communication unit 11411, an image processing unit 11412 and a control unit 11413. The camera head 11102 and the CCU 11201 are connected for communication to each other by a transmission cable 11400.

The lens unit 11401 is an optical system, provided at a connecting location to the lens barrel 11101. Observation light taken in from a distal end of the lens barrel 11101 is guided to the camera head 11102 and introduced into the lens unit 11401. The lens unit 11401 includes a combination of a plurality of lenses including a zoom lens and a focusing lens.

The number of image pickup elements which is included by the image pickup unit 11402 may be one (single-plate type) or a plural number (multi-plate type). Where the image pickup unit 11402 is configured as that of the multi-plate type, for example, image signals corresponding to respective R, G and B are generated by the image pickup elements, and the image signals may be synthesized to obtain a color image. The image pickup unit 11402 may also be configured so as to have a pair of image pickup elements for acquiring respective image signals for the right eye and the left eye ready for three dimensional (3D) display. If 3D display is performed, then the depth of a living body tissue in a surgical region can be comprehended more accurately by the surgeon 11131. It is to be noted that, where the image pickup unit 11402 is configured as that of stereoscopic type, a plurality of systems of lens units 11401 are provided corresponding to the individual image pickup elements.

Further, the image pickup unit 11402 may not necessarily be provided on the camera head 11102. For example, the image pickup unit 11402 may be provided immediately behind the objective lens in the inside of the lens barrel 11101.

The driving unit 11403 includes an actuator and moves the zoom lens and the focusing lens of the lens unit 11401 by a predetermined distance along an optical axis under the control of the camera head controlling unit 11405. Consequently, the magnification and the focal point of a picked up image by the image pickup unit 11402 can be adjusted suitably.

The communication unit 11404 includes a communication apparatus for transmitting and receiving various kinds of information to and from the CCU 11201. The communication unit 11404 transmits an image signal acquired from the image pickup unit 11402 as RAW data to the CCU 11201 through the transmission cable 11400.

In addition, the communication unit 11404 receives a control signal for controlling driving of the camera head 11102 from the CCU 11201 and supplies the control signal to the camera head controlling unit 11405. The control signal includes information relating to image pickup conditions such as, for example, information that a frame rate of a picked up image is designated, information that an exposure value upon image picking up is designated and/or information that a magnification and a focal point of a picked up image are designated.

It is to be noted that the image pickup conditions such as the frame rate, exposure value, magnification or focal point may be designated by the user or may be set automatically by the control unit 11413 of the CCU 11201 on the basis of an acquired image signal. In the latter case, an auto exposure (AE) function, an auto focus (AF) function and an auto white balance (AWB) function are incorporated in the endoscope 11100.

The camera head controlling unit 11405 controls driving of the camera head 11102 on the basis of a control signal from the CCU 11201 received through the communication unit 11404.

The communication unit 11411 includes a communication apparatus for transmitting and receiving various kinds of information to and from the camera head 11102. The communication unit 11411 receives an image signal transmitted thereto from the camera head 11102 through the transmission cable 11400.

Further, the communication unit 11411 transmits a control signal for controlling driving of the camera head 11102 to the camera head 11102. The image signal and the control signal can be transmitted by electrical communication, optical communication or the like.

The image processing unit 11412 performs various image processes for an image signal in the form of RAW data transmitted thereto from the camera head 11102.

The control unit 11413 performs various kinds of control relating to image picking up of a surgical region or the like by the endoscope 11100 and display of a picked up image obtained by image picking up of the surgical region or the like. For example, the control unit 11413 creates a control signal for controlling driving of the camera head 11102.

Further, the control unit 11413 controls, on the basis of an image signal for which image processes have been performed by the image processing unit 11412, the display apparatus 11202 to display a picked up image in which the surgical region or the like is imaged. Thereupon, the control unit 11413 may recognize various objects in the picked up image using various image recognition technologies. For example, the control unit 11413 can recognize a surgical tool such as forceps, a particular living body region, bleeding, mist when the energy treatment tool 11112 is used and so forth by detecting the shape, color and so forth of edges of objects included in a picked up image. The control unit 11413 may cause, when it controls the display apparatus 11202 to display a picked up image, various kinds of surgery supporting information to be displayed in an overlapping manner with an image of the surgical region using a result of the recognition. Where surgery supporting information is displayed in an overlapping manner and presented to the surgeon 11131, the burden on the surgeon 11131 can be reduced and the surgeon 11131 can proceed with the surgery with certainty.

The transmission cable 11400 which connects the camera head 11102 and the CCU 11201 to each other is an electric signal cable ready for communication of an electric signal, an optical fiber ready for optical communication or a composite cable ready for both of electrical and optical communications.

Here, while, in the example depicted, communication is performed by wired communication using the transmission cable 11400, the communication between the camera head 11102 and the CCU 11201 may be performed by wireless communication.

An example of the endoscopic surgery system to which the technology according to the present disclosure can be applied has been described above. The technology according to the present disclosure can be applied to the image pickup unit 11402 of the camera head 11102 among the configurations described above. By applying the technology according to the present disclosure to the camera head 11102, for example, a compact mounting of an imaging device on a system becomes possible.

It is noted that, here, the endoscopic surgery system has been described as an example, but the technology according to the present disclosure may be applied to, for example, a microscopic surgery system or the like.

6. Example of Effects

For example, the imaging device 1 described above is specified as follows. As described with reference to FIGS. 1 to 14 and the like, the imaging device 1 includes the element layer 20, the illumination element 30, and the imaging element 40. The element layer 20 includes the image forming element 20a. The illumination element 30 is provided at the same position as that of the element layer 20 or behind the element layer 20 in the forward-and-rearward direction (Z-axis direction). The imaging element 40 is provided behind the image forming element 20a and the illumination element 30 (on the Z-axis negative direction side). When viewed from the forward-and-rearward direction, the illumination element 30 is provided at a position different from that of the image forming element 20a.

In the imaging device 1 described above, the illumination element 30 is provided at the same position as that of the element layer 20 or behind the element layer 20 in the forward-and-rearward direction. When viewed from the forward-and-rearward direction, the illumination element 30 is provided at a position different from that of the image forming element 20a. As described above, by providing the illumination element 30 immediately after (immediately below) the element layer 20 and at a position different from that of the image forming element 20a, the imaging device 1 can be downsized (thickness reduction, area reduction, and the like) as compared with, for example, a case in which the illumination element is provided in front of the element layer 20.

As described with reference to FIGS. 1 and 2 and the like, the illumination element 30 may include the illumination element 30 positioned between the plurality of image forming elements 20a when viewed from the forward-and-rearward direction. For example, in this manner, the illumination element 30 can be efficiently disposed in the imaging device 1.

As described with reference to FIGS. 1 and 2 and the like, the illumination element 30 is positioned behind the element layer 20 in the forward-and-rearward direction, the element layer 20 has the opening 20b for the illumination element 30, and at least a part of the opening 20b may overlap at least a part of the corresponding illumination element 30 when viewed from the forward-and-rearward direction. For example, in this manner, the subject 2 positioned in the front can be irradiated with light from the illumination element 30.

As described with reference to FIGS. 7 and 8 and the like, the opening 20b may be smaller than the illumination element 30 when viewed from the forward-and-rearward direction. The opening 20b may be a hole having a circular shape, the diameter of which is 50 µm or less, or a size substantially equal to the size of the circular shape. By providing such the small opening 20b, a structure related to illumination, that is, the opening 20b and the illumination element 30 can be hardly visible when the imaging device 1 is viewed from the front. It is also possible to give a high texture to the front surface of the imaging device 1.

As described with reference to FIGS. 9 to 11 and the like, the element layer 20 may have the plurality of openings 20b corresponding to one illumination element 30. Therefore, the subject 2 can be irradiated with more light from the illumination element 30. It is also possible to improve the illumination efficiency while maintaining the texture of the surface of the imaging device 1. By devising the arrangement pattern of the plurality of openings 20b, it is also possible to control (adjust or the like) directional control of the illumination.

As described with reference to FIGS. 1 and 2 and the like, the imaging device 1 may include a light shielding portion that shields light from the element layer 20 to the imaging element 40. The light shielding portion may include a first light shielding wall (for example, the illumination substrate 31) that is provided behind the illumination element 30 and shields light directed rearwards among the light from the illumination element, and a second light shielding wall (for example, the wall portion 32) that is provided so as to surround the illumination element 30 when viewed from the forward-and-rearward direction and shields light directed in the vertical and horizontal directions among the light from the illumination element 30. By providing such a light shielding portion, leakage of the illumination to the imaging surface, that is, reflection of the illumination element 30 can be suppressed.

The image forming element 20a may be at least one of a pinhole, a photon sieve, a microlens, and a Fresnel zone plate. By using such a thin type image forming element 20a, the possibility that the imaging device 1 can be downsized is further increased.

The image forming element 20a may include a hole, and the size of the hole may be a size of a circular shape having a diameter of 50 µm or less or a size substantially equal to the size of the circular shape. By using such a small hole as the image forming element 20a, high-resolution imaging can be performed. Since the image forming element 20a becomes hardly visible when the imaging device 1 is viewed from the front, it is also possible to hide the presence of the image forming element 20a. Therefore, the texture of the imaging device 1 can also be enhanced.

As described with reference to FIGS. 1 and 2 and the like, the illumination element 30 may include a light emitting diode. As a result, for example, the imaging device 1 can be downsized as compared with a case in which a light guide plate or the like is used as the illumination element.

As described with reference to FIGS. 12 to 14 and the like, the element layer 20 may include a light emitting layer of a self-luminous panel (for example, the OLED panel 50) having translucency and a wiring layer, and the image forming element 20a and the illumination element 30 may be formed by the light-emitting layer and a wiring pattern of the wiring layer. Since the element layer 20 is configured to include not only the image forming element 20a but also the illumination element 30, the possibility that the imaging device 1 can be downsized is further increased accordingly.

As described with reference to FIG. 14 and the like, the image forming element 20a may be an image forming element having, as a light-transmitting region, an overlapping region of a light-transmitting region of a Fresnel zone plate and a light-transmitting region of the self-luminous panel (for example, the OLED panel 50). Such an image forming element 20a can also function as a Fresnel zone plate or a photon sieve. The light transmittance can be improved, and as such, for example, a bright image can be obtained.

The imaging device 1 may be a fingerprint imaging device. Provided is a downsized fingerprint imaging device.

It is noted that the effects described in the present disclosure are merely examples and are not limited to the disclosed contents. There may be other effects.

Although the embodiments of the present disclosure have been described above, the technical scope of the present disclosure is not limited to the above-described embodiments as it is, and various modifications can be made without departing from the gist of the present disclosure. In addition, components of different embodiments and modifications may be appropriately combined.

It is noted that the present technology can also have the following configurations.

(1) An imaging device comprising:
an element layer including an image forming element;
an illumination element provided at the same position as a position of the element layer or behind the element layer in a forward-and-rearward direction; and
an imaging element provided behind the image forming element and the illumination element, wherein
the illumination element is provided at a position different from a position of the image forming element when viewed from the forward-and-rearward direction.

(2) The imaging device according to (1), wherein
the illumination element includes an illumination element positioned between a plurality of the image forming elements when viewed from the forward-and-rearward direction.

(3) The imaging device according to (1) or (2), wherein
the illumination element is positioned behind the element layer in the forward-and-rearward direction,
the element layer has an opening corresponding to the illumination element, and
at least a part of the opening overlaps at least a part of the corresponding illumination element when viewed from the forward-and-rearward direction.

(4) The imaging device according to (3), wherein
the opening is smaller than the illumination element when viewed from the forward-and-rearward direction.

(5) The imaging device according to (4), wherein
the opening is a hole having a size of a circular shape, a diameter of which is 50 μm or less, or a size substantially equal to the size of the circular shape.

(6) The imaging device according to (4) or (5), wherein
the element layer has a plurality of the openings corresponding to the one illumination element.

(7) The imaging device according to any one of (1) to (6), further comprising
a light shielding portion configured to shield light from the illumination element to the imaging element.

(8) The imaging device according to (7), wherein
the light shielding portion includes:
a first light shielding wall provided behind the illumination element and configured to shield light directed rearwards among the light from the illumination element; and
a second light shielding wall provided so as to surround the illumination element when viewed from the forward-and-rearward direction and configured to shield light directed in vertical and horizontal directions among the light from the illumination element.

(9) The imaging device according to any one of (1) to (8), wherein
the image forming element is at least one of a pinhole, a photon sieve, a microlens, and a Fresnel zone plate.

(10) The imaging device according to any one of (1) to (9), wherein
the image forming element includes a hole, and
a size of the hole is a size of a circular shape having a diameter of 50 μm or less or a size substantially equal to the size of the circular shape.

(11) The imaging device according to any one of (1) to (10), wherein
the illumination element includes a light emitting diode.

(12) The imaging device according to any one of (1) to (10), wherein
the element layer includes a light-emitting layer of a self-luminous panel having translucency and a wiring layer, and
the image forming element and the illumination element are formed by combining the light-emitting layer and a wiring pattern of the wiring layer.

(13) The imaging device according to (12), wherein
the image forming element is an image forming element having, as a light-transmitting region, an overlapping region of a light-transmitting region of a Fresnel zone plate and a light-transmitting region of the self-luminous panel.

(14) The imaging device according to (12) or (13), wherein
the self-luminous panel is an OLED panel.

(15) The imaging device according to any one of (1) to (14), wherein
the imaging device is a fingerprint imaging device.

REFERENCE SIGNS LIST

1 IMAGING DEVICE
10 TRANSPARENT LAYER
20 ELEMENT LAYER
20a IMAGE FORMING ELEMENT
20b OPENING
30 ILLUMINATION ELEMENT
31 ILLUMINATION SUBSTRATE
31a OPENING
32 WALL PORTION
32a OPENING
32b OPENING
40 IMAGING ELEMENT
41 IMAGING SUBSTRATE
42 WALL PORTION
50 OLED PANEL
51 LIGHT-TRANSMITTING REGION
52 NON-LIGHT-TRANSMITTING REGION
60 SMARTPHONE
70 SMART GLASSES
80 DOOR

The invention claimed is:

1. An imaging device, comprising:
an element layer including a plurality of image forming elements;
an illumination element between the plurality of image forming elements in a forward-and-rearward direction of the imaging device, wherein
in the forward-and-rearward direction, a position of the illumination element is different from a position of an image forming element of the plurality of image forming elements, and
in the forward-and-rearward direction, the illumination element is one of behind the element layer or at the position that is same as a position of the element layer; and
an imaging element behind the image forming element and the illumination element.

2. The imaging device according to claim 1, wherein
the illumination element is behind the element layer in the forward-and-rearward direction,
the element layer has an opening corresponding to the illumination element, and
at least a part of the opening overlaps at least a part of the illumination element in the forward-and-rearward direction.

3. The imaging device according to claim 2, wherein the opening is smaller than the illumination element in the forward-and-rearward direction.

4. The imaging device according to claim 3, wherein
the opening is a hole having a circular shape, and
a diameter of the opening is 50 μm or less.

5. The imaging device according to claim 3, wherein
the element layer has a plurality of openings corresponding to the illumination element, and
the plurality of openings includes the opening.

6. The imaging device according to claim 1, further comprising a light shielding portion configured to shield light beams from the illumination element to the imaging element.

7. The imaging device according to claim 6, wherein the light shielding portion includes:
a first light shielding wall behind the illumination element, wherein the first light shielding wall is configured to shield a first light beam, of the light beams, directed in a rearward direction of the imaging device; and
a second light shielding wall that surrounds the illumination element in the forward-and-rearward direction,
wherein the second light shielding wall is configured to shield a second light beam, of the light beams, directed in one of a vertical direction or a horizontal direction.

8. The imaging device according to claim 1, wherein the image forming element is at least one of a pinhole, a photon sieve, a microlens, or a Fresnel zone plate.

9. The imaging device according to claim 1, wherein
the image forming element includes a hole,
the hole has a circular shape, and
a diameter of the hole is 50 μm or less.

10. The imaging device according to claim 1, wherein the illumination element includes a light emitting diode.

11. The imaging device according to claim 1, further comprising a self-luminous panel that includes a wiring layer and a light-emitting layer, wherein
the self-luminous panel has translucency,
the element layer corresponds to the light-emitting layer of the self-luminous panel, and
the image forming element and the illumination element correspond to the light-emitting layer and a wiring pattern of the wiring layer.

12. The imaging device according to claim 11, wherein the image forming element includes a Fresnel zone plate, and
a light-transmitting region of the image forming element is an overlapping region of a light-transmitting region of the Fresnel zone plate and a light-transmitting region of the self-luminous panel.

13. The imaging device according to claim 11, wherein the self-luminous panel is an OLED panel.

14. The imaging device according to claim 1, wherein the imaging device is a fingerprint imaging device.

15. An imaging device, comprising:
an element layer including an image forming element;
an illumination element behind the element layer in a forward-and-rearward direction of the imaging device, wherein
a position of the illumination element is different from a position of the image forming element in the forward-and-rearward direction,
the element layer has an opening corresponding to the illumination element, and
at least a part of the opening overlaps at least a part of the illumination element in the forward-and-rearward direction; and
an imaging element behind the image forming element and the illumination element.

* * * * *